United States Patent
Kadirvel et al.

(10) Patent No.: US 12,547,533 B2
(45) Date of Patent: *Feb. 10, 2026

(54) SYSTEM AND METHOD FOR USER INTERFACE TESTING

(71) Applicant: Verizon Patent and Licensing Inc., Basking Ridge, NJ (US)

(72) Inventors: Karthikeyan Kadirvel, Tamil Nadu (IN); Sandeep K Kotha, Telangana (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 295 days.

This patent is subject to a terminal disclaimer.

(21) Appl. No.: 18/135,240

(22) Filed: Apr. 17, 2023

(65) Prior Publication Data

US 2023/0409467 A1 Dec. 21, 2023

Related U.S. Application Data

(63) Continuation-in-part of application No. 17/842,852, filed on Jun. 17, 2022, now Pat. No. 12,086,056.

(51) Int. Cl.
*G06F 11/3698* (2025.01)

(52) U.S. Cl.
CPC .............. *G06F 11/3698* (2025.01)

(58) Field of Classification Search
CPC ...................................... G06F 11/36
See application file for complete search history.

(56) References Cited

U.S. PATENT DOCUMENTS

| | | | |
|---|---|---|---|
| 2006/0020597 A1* | 1/2006 | Keating | G06F 16/5838 |
| 2008/0010292 A1* | 1/2008 | Poola | G06F 16/986 |
| | | | 707/E17.118 |
| 2013/0004087 A1 | 1/2013 | Kumar et al. | |
| 2013/0330004 A1 | 12/2013 | Bala et al. | |
| 2015/0347284 A1 | 12/2015 | Hey et al. | |
| 2018/0025503 A1 | 1/2018 | Tsai et al. | |

* cited by examiner

*Primary Examiner* — Duy Khuong T Nguyen

(57) ABSTRACT

In an example, images of an interface of an application may be identified. The images may be clustered into groups associated with layouts of the interface. An image of a first group associated with a first layout may be compared with a second image of the first group to determine a first set of regions, of the interface, in which the second image is different than the first image. Based upon the first set of regions, a set of dynamic regions of the interface may be determined. A fourth image of the interface may be identified. The fourth image may be determined to correspond to the first layout of the interface. Based upon the set of dynamic regions, a first portion of the fourth image may be compared with a first portion of the first image to determine user interface testing information associated with the interface of the application.

20 Claims, 19 Drawing Sheets

101 ⟶

124

User Sign-Up Page

Username: [　　　　　　　　　　]
First Name: [　　　　　　　　　　]
Last Name: [　　　　　　　　　　]
Email Address: [　　　　　　　　　　]

Receive promotional emails from us! ☐

By signing up, you are agreeing to our terms and conditions. For more information, please click here.

[ Sign Up ] [ Close ]

User Sign-Up Page

Username: [TitaniumBikes]
First Name: [John]
Last Name: [Smith]
Email Address: [johnsmith1776@emailservice.com]

Receive promotional emails from us! ✓

By signing up, you are agreeing to our terms and conditions. For more information, please click here.

[ Sign Up ] [ Close ]

User Sign-Up Page — 124
138

Username: [_____]
First Name: [_____]
Last Name: [_____]
Email Address: [_____]

Receive promotional emails from us! ☐

By signing up, you are agreeing to our terms and conditions. For more information, please click here.

[ Sign Up ]  [ Close ]

User Sign-Up Page — 172

Username: Timtasticbikes
First Name: Tim
Last Name: Jones
Email Address: timjones2020@emailservice.com Receive promotional emails from us! ☐

By signing up, you are agreeing to our terms and conditions. For more information, please click here.

[ Sign Up ]

User Sign-Up Page

Username: Timtasticbikes
First Name: Tim
Last Name: Jones
Email Address: timjones2020@emailservice.com Receive promotional emails from us! ☐

By signing up, you are agreeing to our terms and conditions. For more information, please click here.

( Sign Up )  ⌐ ─ ─ ─ ┐ ⟵ 184

101 ⟶

SYSTEM AND METHOD FOR USER INTERFACE TESTING

RELATED APPLICATION

This application claims priority to and is a continuation-in-part of U.S. application Ser. No. 17/842,852, filed on Jun. 17, 2022, entitled "SYSTEM AND METHOD FOR USER INTERFACE TESTING", which is incorporated by reference herein in its entirety.

BACKGROUND

Users are provided with services via applications, such as mobile applications, web applications (e.g., websites), client applications, gaming applications, etc. A user may interact with a user interface of an application. In an example where the application is a shopping application, the user may add items to their shopping cart, read reviews of the items, order the items, etc. using the user interface. However, if the user interface has errors, such as where buttons, graphical objects, text, etc. aren't shown or are misplaced, the application may not function correctly and/or the user may not be able to use the application, thereby contributing to a negative experience for the user.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1G is a diagram illustrating an example of a reference image according to some embodiments.

FIG. 1H is a diagram illustrating an example of a second image according to some embodiments.

FIG. 1M is a diagram illustrating an example of a set of dynamic region contours according to some embodiments.

FIG. 1N is a diagram illustrating an example of a fourth image according to some embodiments.

FIG. 1O is a diagram illustrating an example system for performing user interface testing, where a group associated with a fourth image is identified according to some embodiments.

DETAILED DESCRIPTION OF EXAMPLE EMBODIMENTS

Figure 1A:
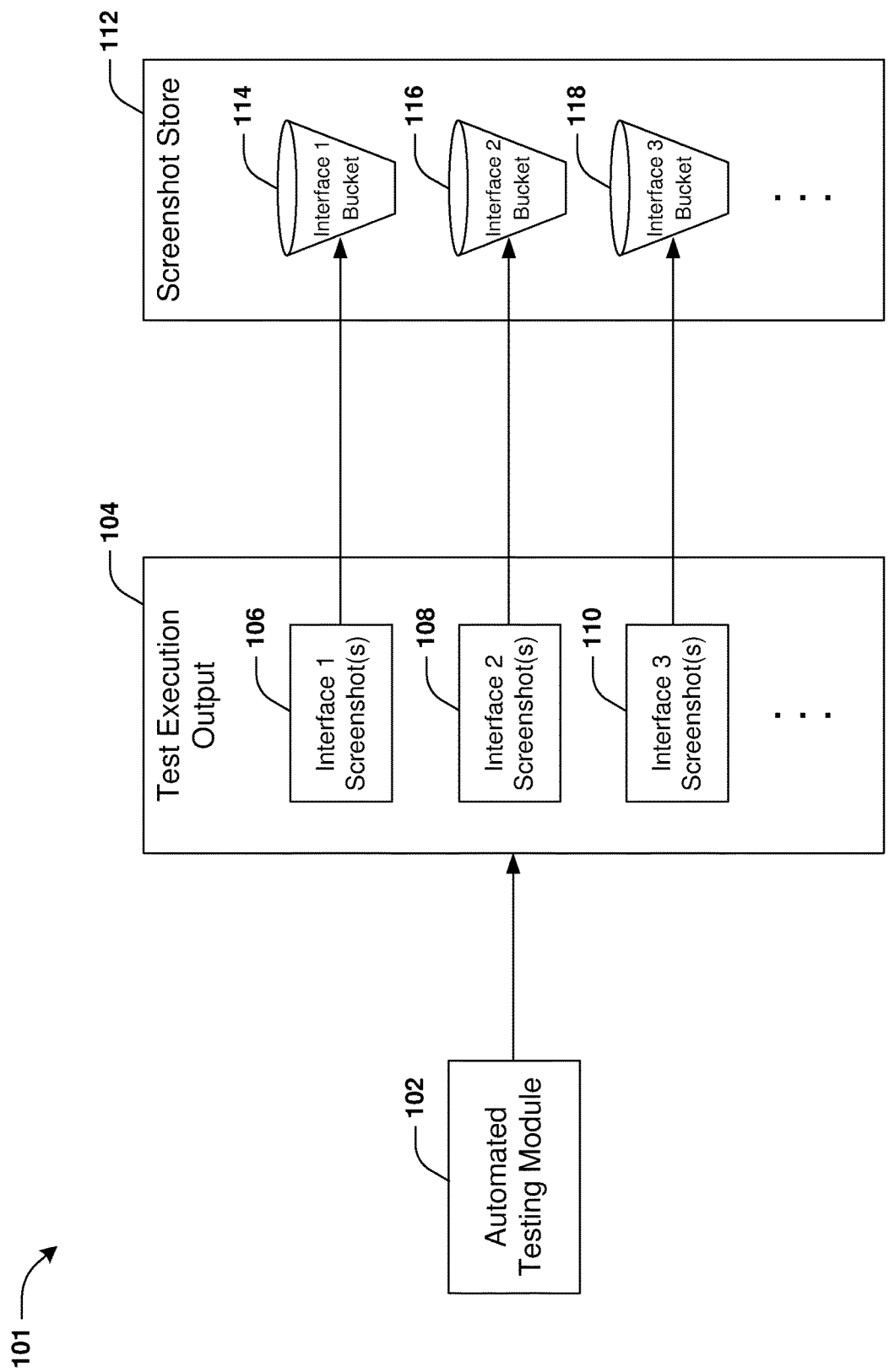
FIG. 1A is a diagram illustrating an example system for performing user interface testing, where images of one or more interfaces are generated and/or stored according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for performing user interface testing are provided. A user may interact with a user interface of an application. However, if the user interface has errors, such as where buttons, graphical objects, text, etc. aren't shown or are misplaced, the application may not function correctly and/or the user may not be able to use the application, thereby contributing to a negative experience for the user. In some cases, a tester may be tasked with manually testing the user interface of the application to test for user interface errors and/or validate the user interface. However, manually testing the user interface may be expensive, and due to human error, the tester may miss at least some user interface errors that exist in the application.

Thus, in accordance with one or more of the techniques provided herein, user interface testing may be performed to automatically detect user interface errors in the application. The user interface testing may be performed using images of one or more interfaces of the application, such as screenshots of the application captured when automated tests of the application are being executed. Using one or more of the techniques provided herein, the images of interfaces of the application are used to determine (e.g., learn) dynamic regions and/or static regions of interfaces of the application. The images, the dynamic regions and/or the static regions may be used for user interface testing (e.g., user interface validation) of the application, such as testing that is performed to determine whether or not an interface of the application functions correctly and/or whether or not features of the interface are displayed properly (e.g., as intended by an entity designing and/or maintaining the application). A dynamic region may correspond to a region of an interface of the application that has visual characteristics that change due to factors such as at least one of time, user interactions, data input to the application, etc. A static region may correspond to a region of an interface of the application that is not configured to change (e.g., is not configured to change visually). Since static regions of the application are not configured to change (and/or are configured to change less frequently than dynamic regions), identification of a change in a static region of the application may be reflective of a user interface error in the application. Using the techniques herein, user interface errors associated with changes to static regions of the application may be detected.

However, use of dynamic and/or interactive elements in applications may make identifying dynamic and/or static regions of an interface difficult. For example, such dynamic and/or interactive elements may include pop-up information messages and/or other elements that may change position and/or may appear, disappear, and/or reappear at different times and/or in response to one or more triggers (e.g., one or more triggers associated with at least one of time, user interactions, data input to the application, etc.). For example, the dynamic and/or interactive elements may cause changes to an interface, where in a first situation (e.g., where one or more first conditions are met), the interface may have a first layout (e.g., at least one of a first structure, a first appearance, a first arrangement, etc.) and/or in a second situation (e.g., where one or more second conditions are met), the same interface (e.g., the same page of the application) has a second layout (e.g., at least one of a second structure, a second appearance, a second arrangement, etc.) different than the first layout. The second layout may be different than the first layout due to at least one of (i) the interface comprising one or more elements (e.g., interactive elements) in the first situation that the interface does not comprise in the second situation (e.g., a pop-up message may overlay the interface in the first situation, but may not overlay the interface in the second situation), (ii) the interface not comprising one or more elements (e.g., interactive elements) in the first situation that the interface comprises in the second situation (e.g., a pop-up message may not overlay the interface in the first situation, but may overlay the interface in the second situation), (iii) one or more elements (e.g., interactive elements) of the interface in the first situation having different positions, sizes, colors, shapes, formats, etc. than the one or more elements in the second situation, etc. Accordingly, if different layouts of an interactive interface (e.g., the same page and/or section of the application) are not distinguished from each other, and merely a single set of dynamic regions and/or a single set of static regions are determined for (all the different layouts of) the interactive interface, the single set of static regions may cover too little (e.g., less than a threshold proportion) of the interactive interface to be used for accurately identifying one or more user interface errors in the interactive interface (e.g., a large portion of the interactive interface may be covered by differences associated with the interactive elements and/or the different layouts of the interactive interface).

Thus, in accordance with one or more of the techniques provided herein, images of an interface (e.g., an interactive interface) of the application may be clustered into groups associated with (different) layouts of the interface. The images may be clustered based upon at least one of comparison metrics associated with the images, histograms associated with the images, layout representations associated with the images, etc. For each group associated with a layout of the interface, a set of dynamic regions and/or a set of static regions associated with the layout may be determined based upon images in the group. In response to identifying an image of the interface (e.g., the image may correspond to a screenshot of the interface collected via execution of one or more automated tests on the application), the image may be compared with layouts of the different groups to determine which layout the image corresponds to (e.g., which group the image belongs to). In response to determining that the image corresponds to a first group and/or a first layout, a static portion of the image may be identified based upon a set of dynamic regions and/or a set of static regions determined for the first group and/or the first layout. The static portion of the image may be analyzed (e.g., compared with a static portion of a reference image of the first group) to identify one or more user interface errors in the image. In this way, using the techniques provided herein, even in cases where an interface of an application has dynamic and/or interactive elements and/or has different (e.g., significantly different) layouts (and/or in cases where pixel drifting occurs between images of the interface), user interface testing may be performed to (accurately) identify one or more user interface errors in an image of the interface.

In some examples, one or more corrective actions may be performed based upon the detection of one or more user interface errors. For example, the one or more corrective actions may comprise flagging the one or more user interface errors and/or sending an alert to a quality assurance system (using quality assurance software, for example) and/or a user interface agent device (e.g., a device belonging to an agent tasked with maintaining and/or testing the application, such as a testing developer of the application). The alert may be indicative of the one or more user interface errors and/or may be indicative of instructions to fix the one or more user interface errors such that the quality assurance system and/or the agent can quickly and/or conveniently fix the one or more user interface errors. In an example, the alert may comprise an email notification sent to an email account associated with the quality assurance system and/or the agent. The alert may be transmitted automatically in response to the detection of the one or more user interface errors. In an example, the alert may comprise a visual representation identifying the first user interface error (e.g., a locality of the first user interface error may be identified by the visual representation). Alternatively and/or additionally, the one or more corrective actions may comprise issuing a ticket (indicative of the one or more user interface errors, for example) to an issue tracking system associated with the application (e.g., the issue tracking system may keep track of statuses of tickets). The issue tracking system may notify (e.g., automatically notify) the quality assurance system and/or the user interface agent device of the ticket, and may label the ticket as "closed" once the ticket is determined to be resolved (e.g., the one or more user interface errors are fixed). Alternatively and/or additionally, the one or more corrective actions may comprise modifying (e.g., automatically modifying) the application to fix the one or more user interface errors.

Accordingly, using one or more of the techniques provided herein, the one or more user interface errors may be detected automatically with less (and/or zero) manual effort and/or with increased accuracy. Alternatively and/or additionally, performing the one or more corrective actions may result in the one or more user interface errors being fixed more quickly, and thus may result in improved performance of a computer running the application.

Figure 1B:
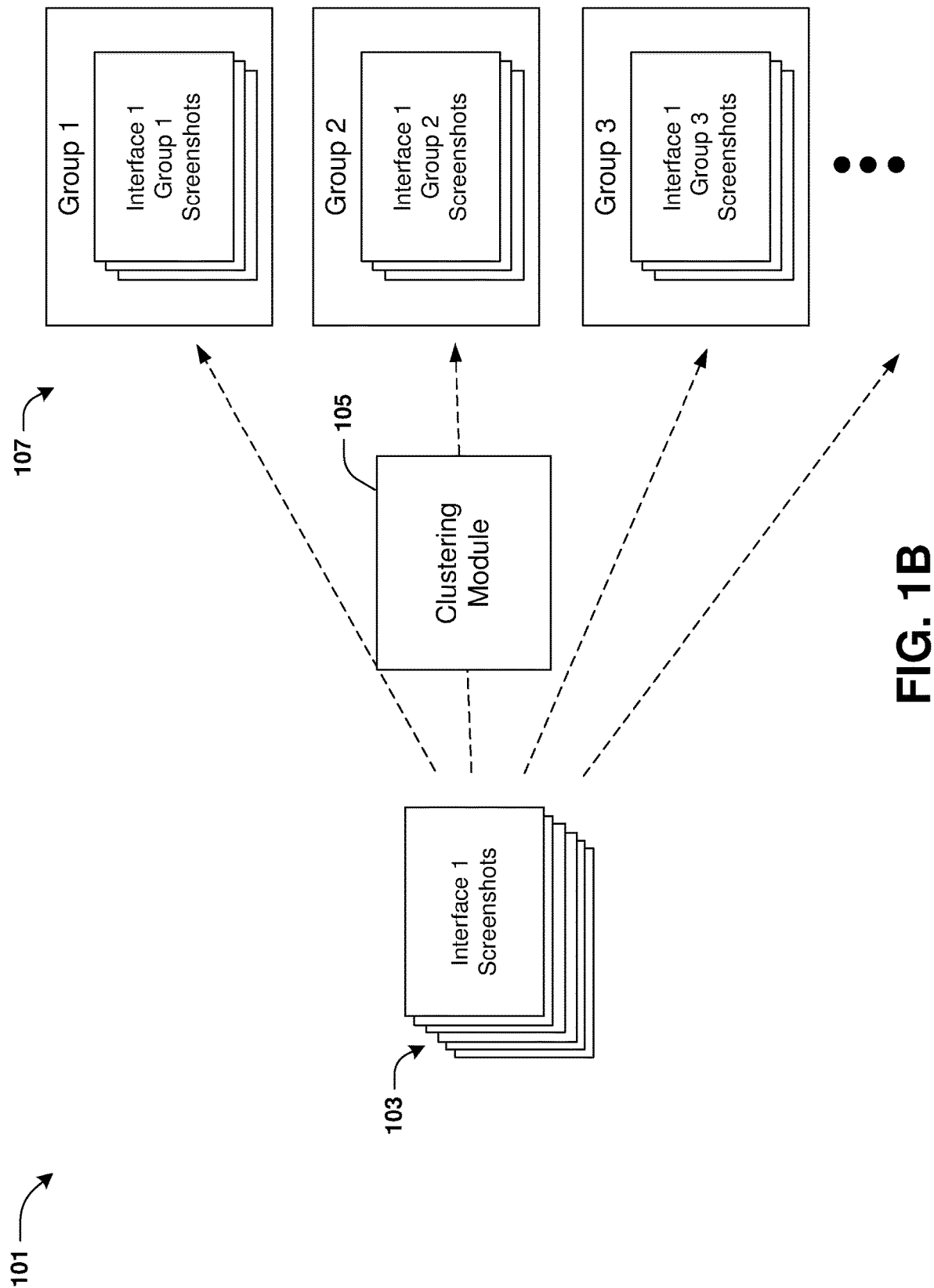
FIG. 1B is a diagram illustrating an example system for performing user interface testing, where images are clustered into groups according to some embodiments.
Figure 1C:
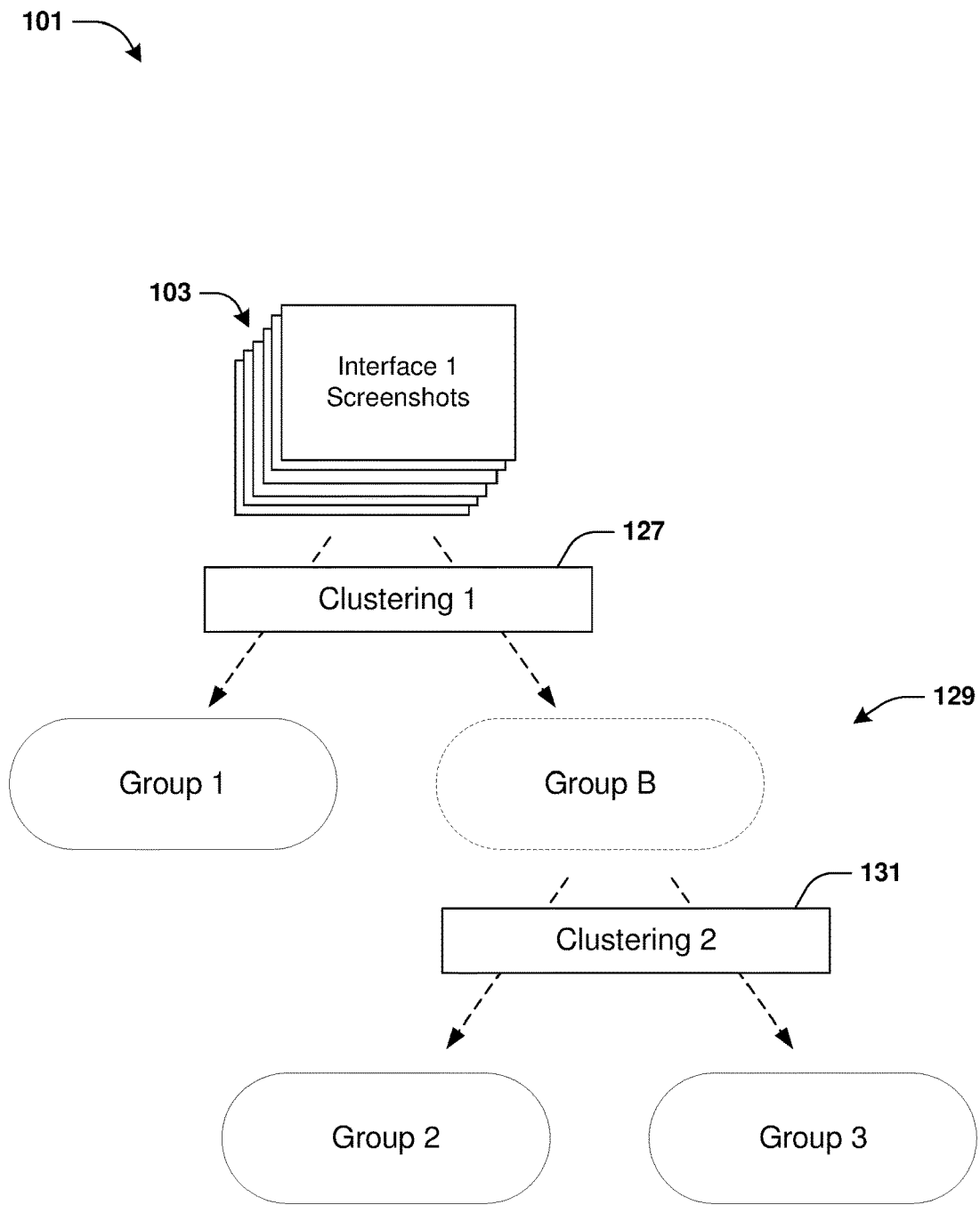
FIG. 1C is a diagram illustrating an example system for performing user interface testing, where multiple levels of clustering are performed to derive groups of images according to some embodiments.
Figure 1D:
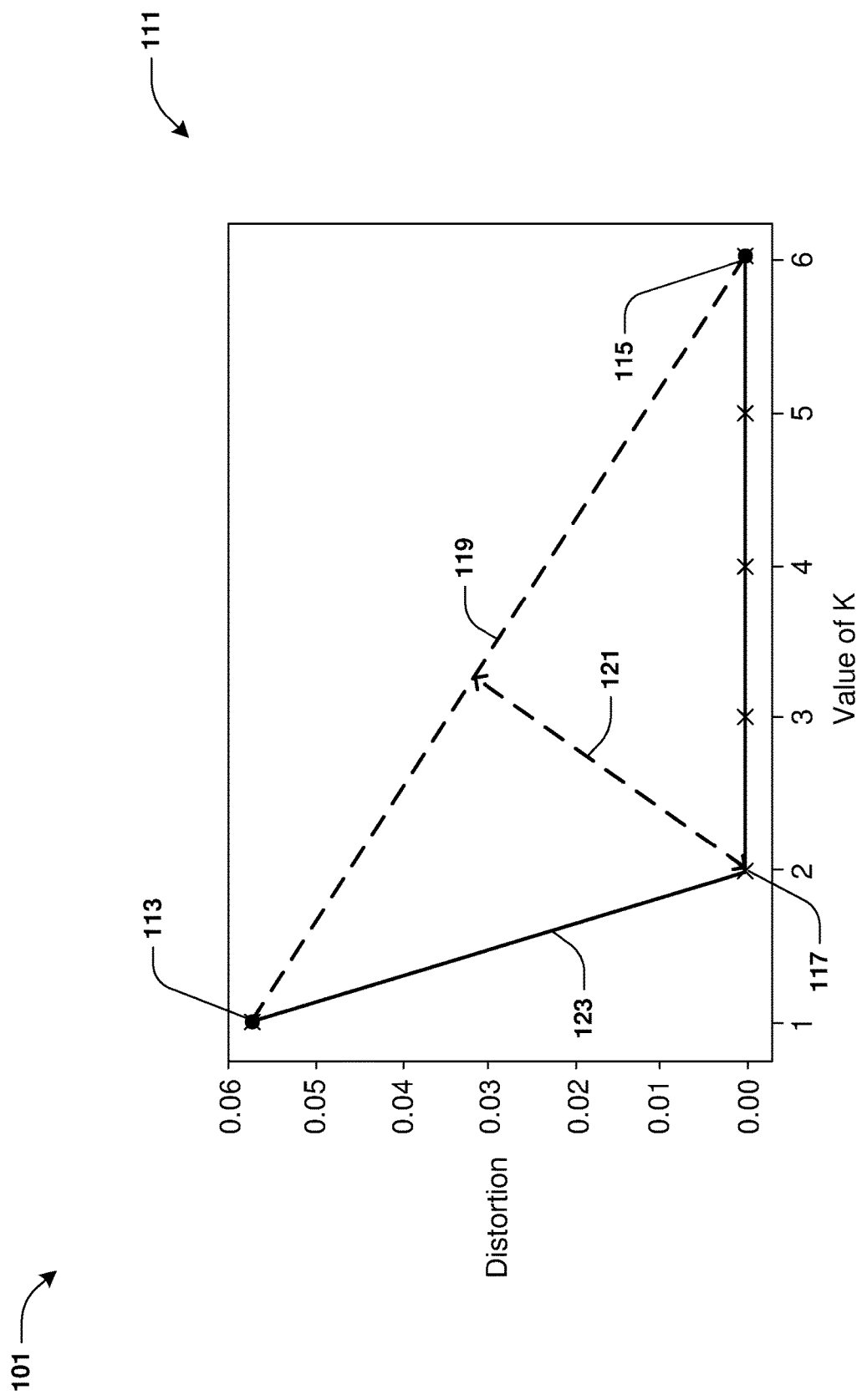
FIG. 1D illustrates variance metrics which are used to determine a quantity of groups of a clustering process according to some embodiments.
Figure 1E:
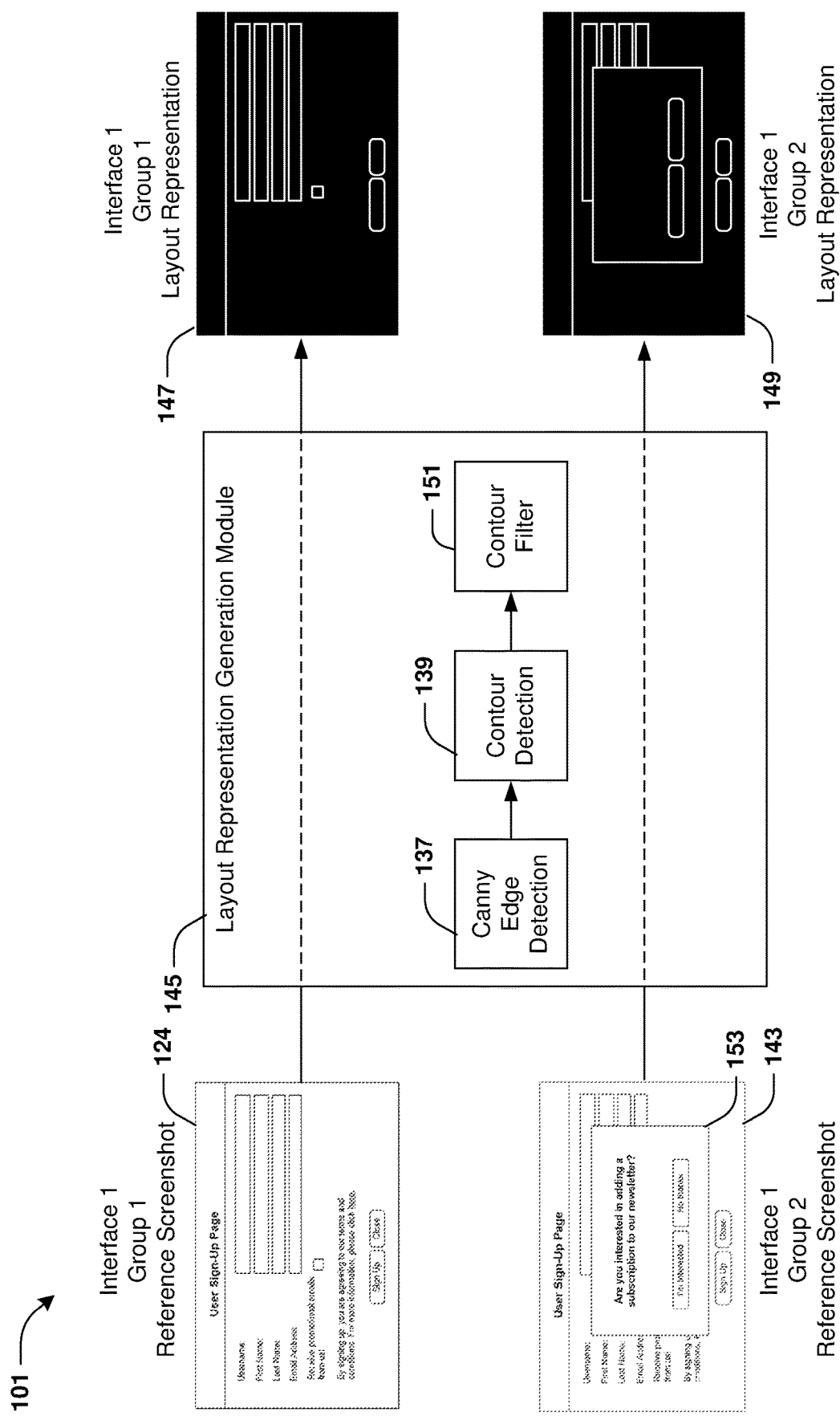
FIG. 1E is a diagram illustrating an example system for performing user interface testing, where layout representations of images are determined according to some embodiments.
Figure 1F:
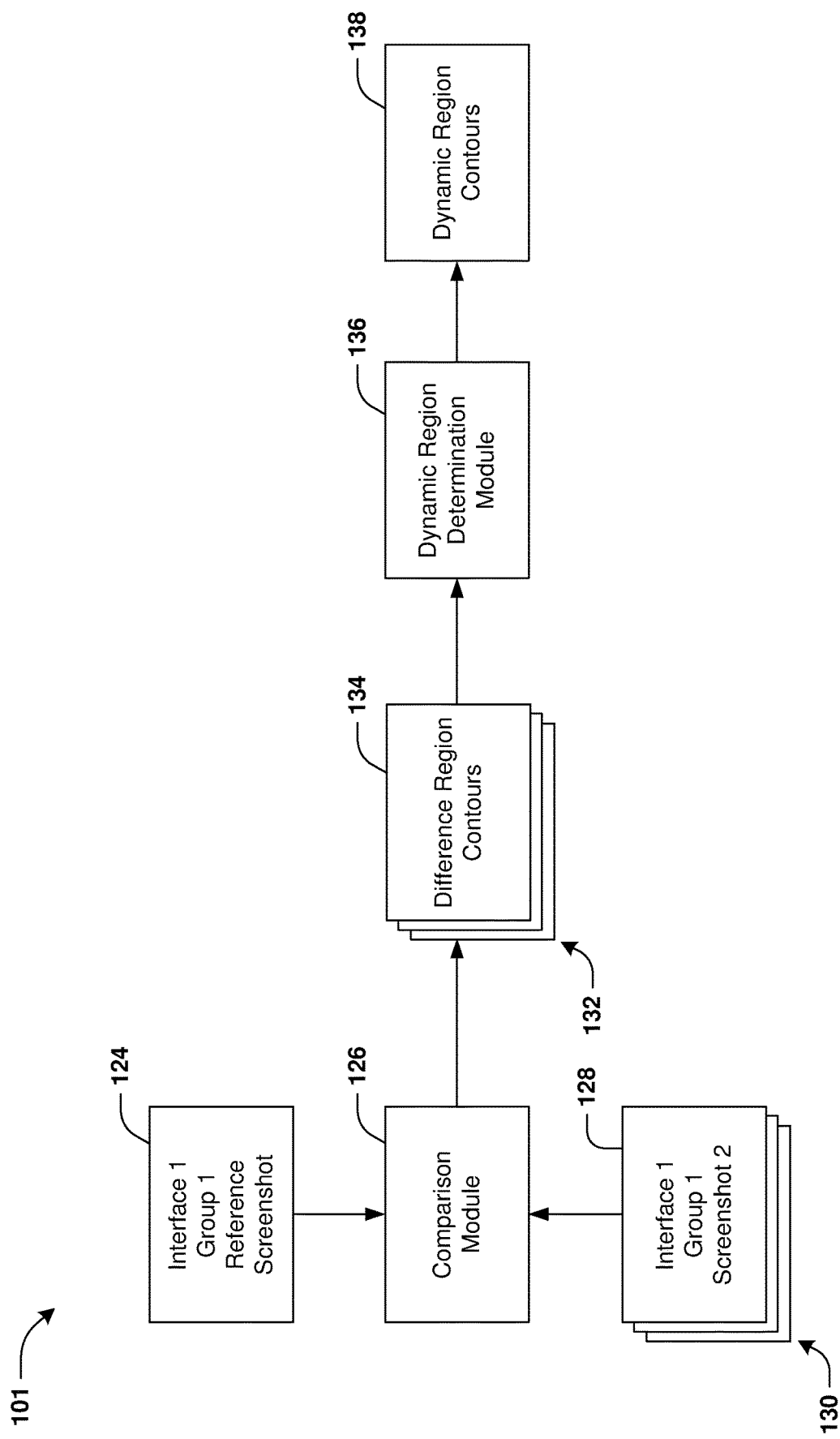
FIG. 1F is a diagram illustrating an example system for performing user interface testing, where a set of dynamic regions of a first interface is determined according to some embodiments.
Figure 1I:
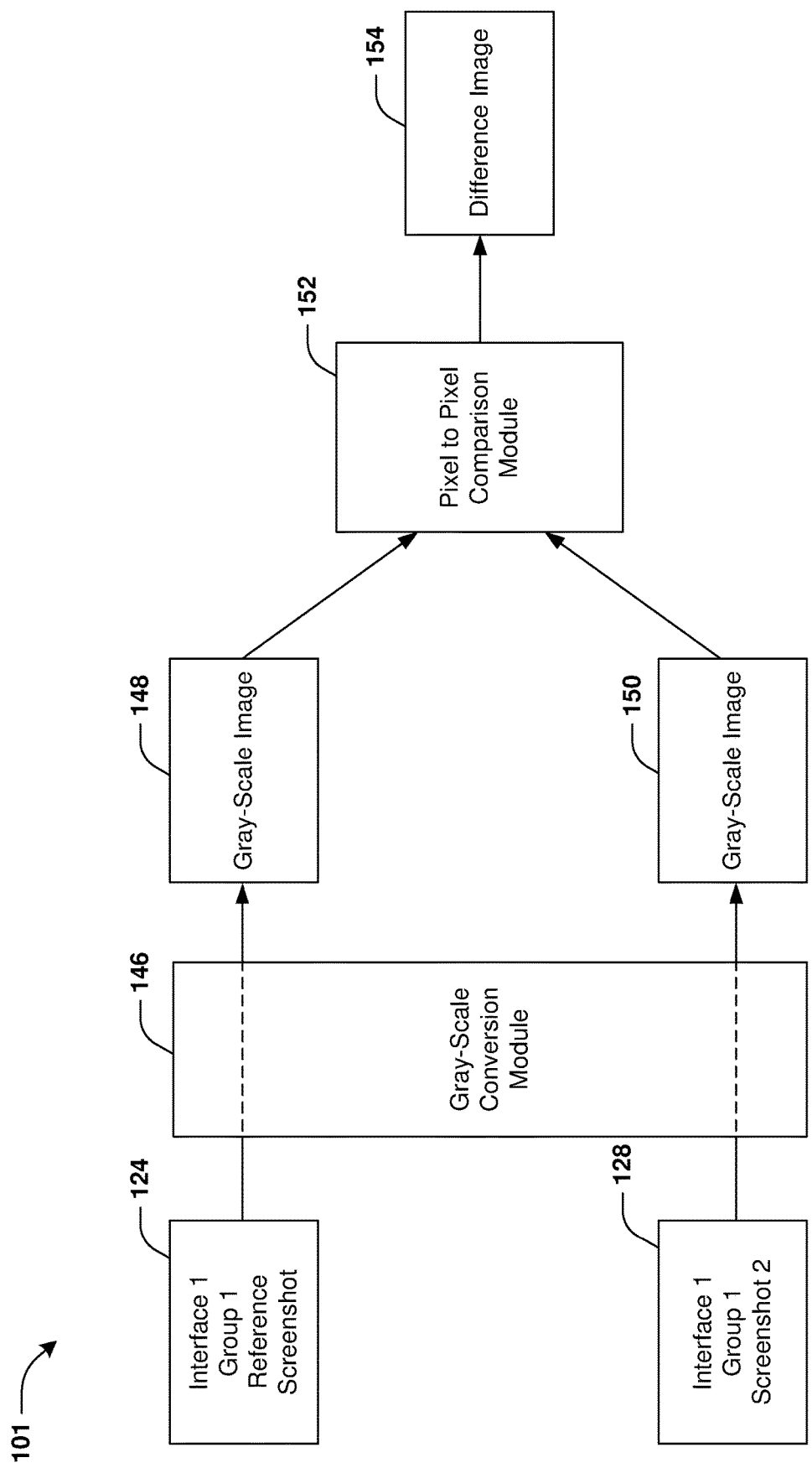
FIG. 1I is a diagram illustrating an example system for performing user interface testing, where a difference image is generated based upon a reference image and a second image according to some embodiments.
Figure 1J:
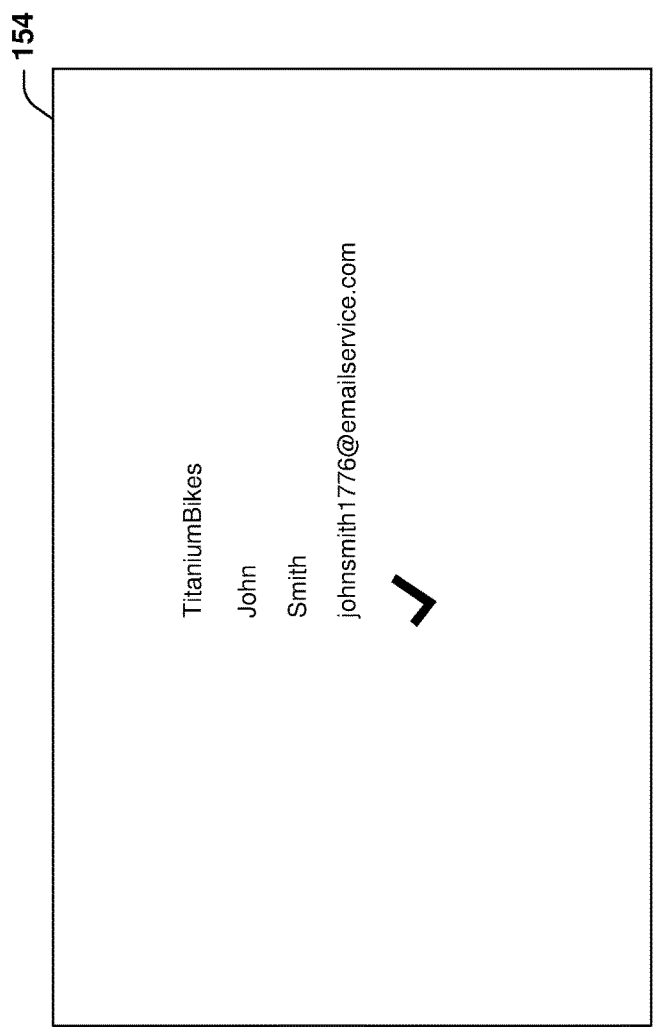
FIG. 1J is a diagram illustrating an example of a difference image representative of differences between a first gray-scale image and a second gray-scale image according to some embodiments.
Figure 1K:
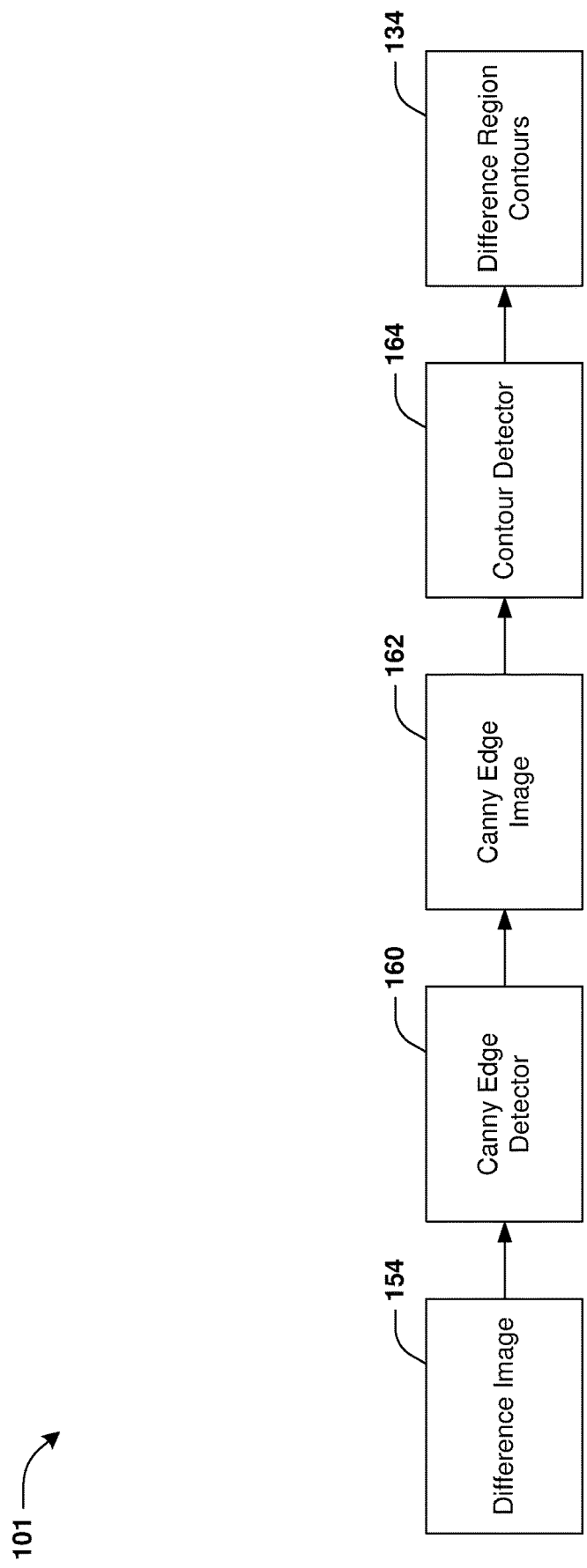
FIG. 1K is a diagram illustrating an example system for performing user interface testing, where a first set of difference region contours is generated based upon a difference image according to some embodiments.
Figure 1L:
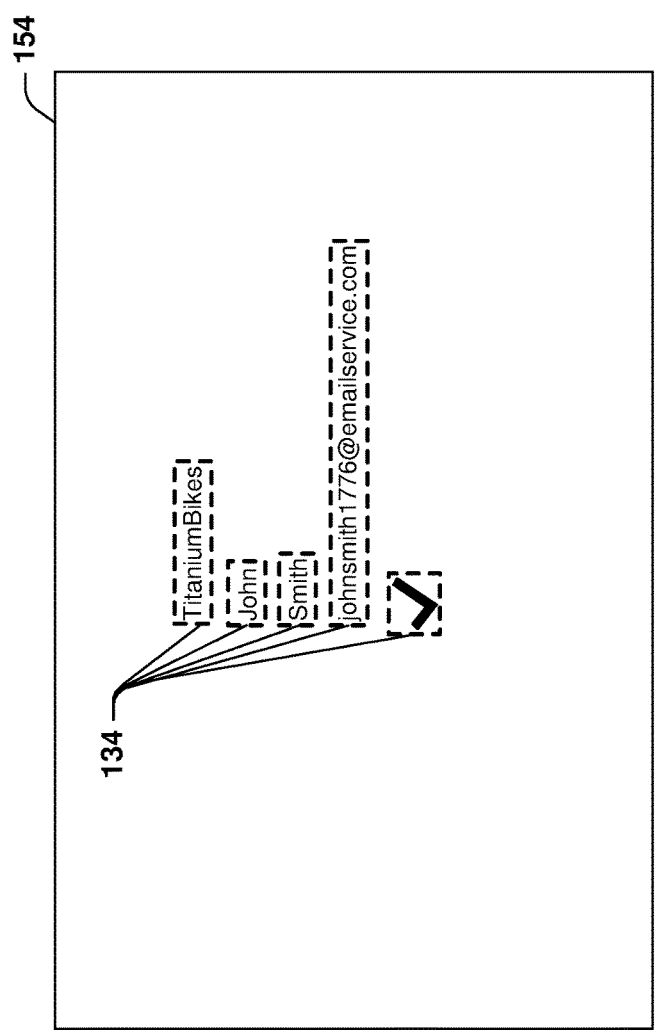
FIG. 1L is a diagram illustrating an example of a first set of difference region contours according to some embodiments.
Figure 10:
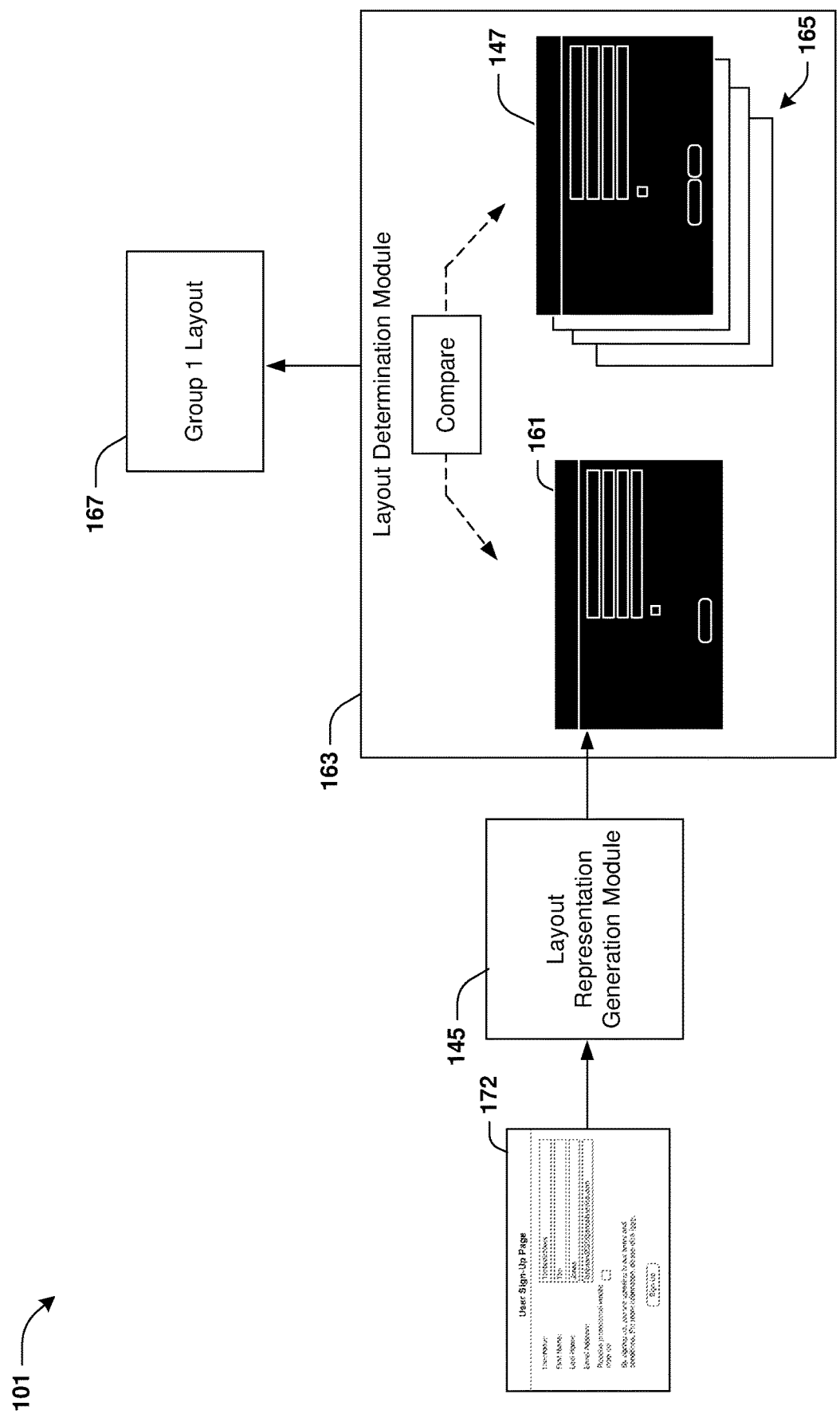
Figure 1P:
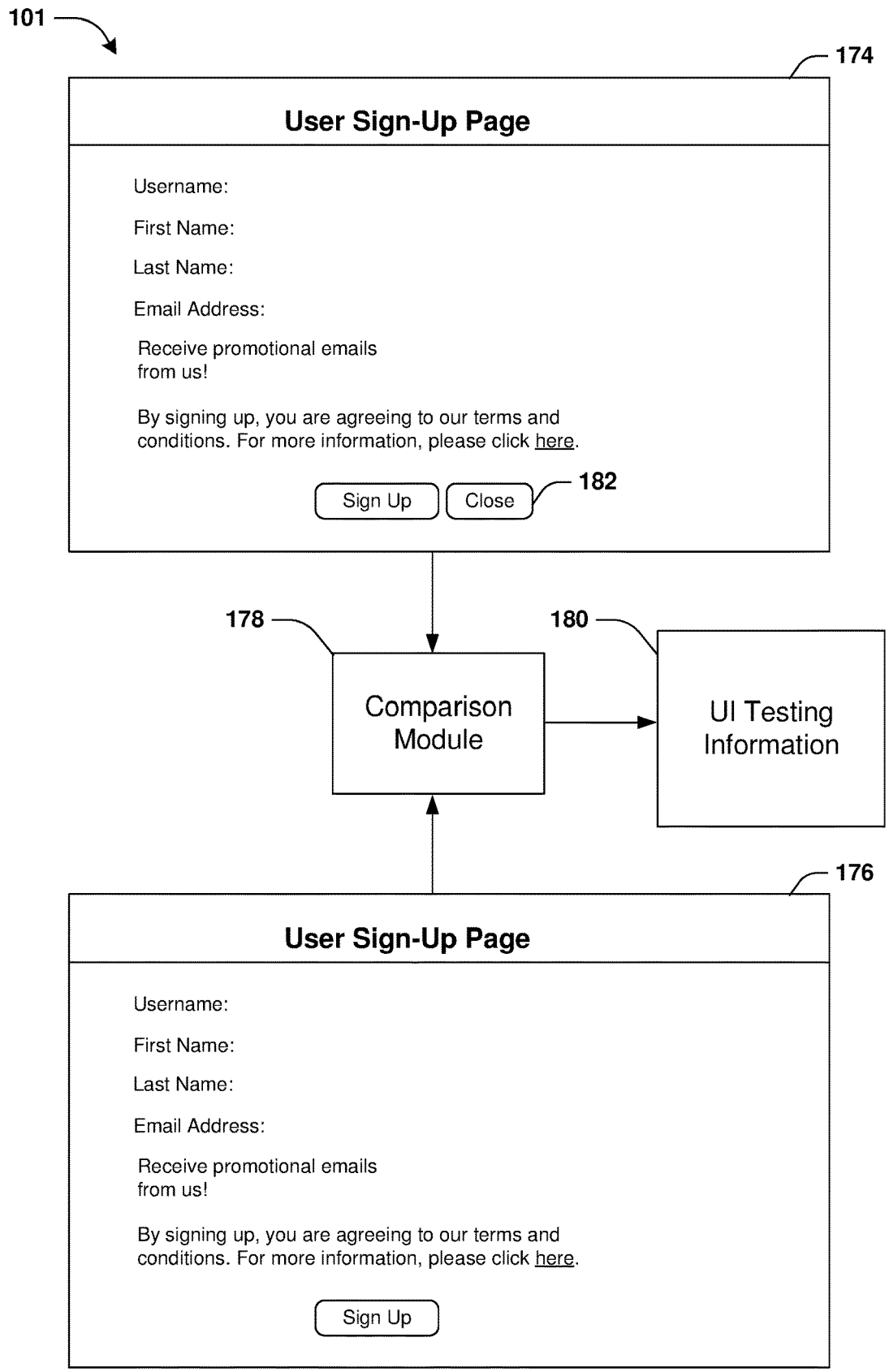
FIG. 1P is a diagram illustrating an example system for performing user interface testing, where user interface testing information is generated based upon a static portion of a fourth image and a static portion of a reference image according to some embodiments.
Figures 1Q, 1R:
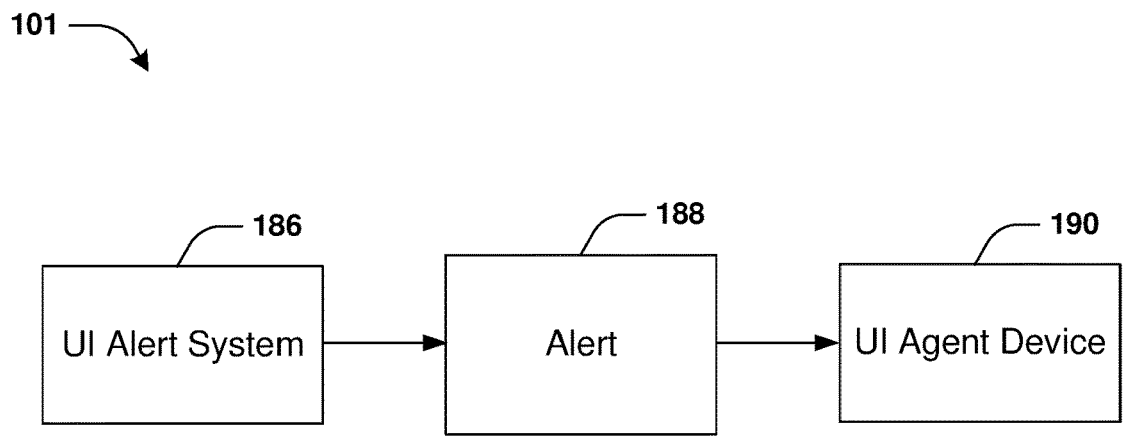
FIG. 1Q is a diagram illustrating an example of a representation, of a fourth image, comprising an indication of a first user interface error according to some embodiments.
FIG. 1R is a diagram illustrating an example system for performing user interface testing, where an interface alert system transmits an alert to a user interface agent device according to some embodiments.

FIGS. 1A-1R illustrate examples of a system 101 for performing user interface testing of a first application. In an example, the first application may comprise a mobile application, a web application (e.g., a website), a client application, a gaming application, etc. Examples of the first application include a shopping application (e.g., a shopping website, a shopping mobile application, etc. with which one or more products and/or services can be purchased), an email application, a content application (e.g., a content website, a content mobile application, etc. with which music, videos, blogs, etc. can be consumed and/or shared), a communication application (e.g., a communication website, a communication mobile application, etc. with which users can communicate with each other via messaging, calls, etc.), etc. Interface testing may be performed on the first application periodically to ensure that the first application functions properly over time. In an example, a user (tester) may access and/or interact with the first application using a client device, such as at least one of a desktop, a laptop, a smartphone, a tablet, a wearable device, a computer, hardware, software, etc. Alternatively and/or additionally, interface testing may be performed on the first application after a (new) feature is implemented (e.g., added) to the first application to check whether or not implementation of the feature has an unintended and/or detrimental impact on one or more interfaces of the first application. Alternatively and/or additionally, interface testing may be performed on different versions of the first application, such as one or more application builds of the first application, one or more pre-release versions of the first application, one or more post-release versions of the first application, etc.

According to one or more of the techniques of the present disclosure, images of interfaces of the first application are used to determine (e.g., learn) dynamic regions and/or static regions of interfaces of the first application. The images, the dynamic regions and/or the static regions may be used for user interface testing (e.g., user interface validation) of the first application, such as testing that is performed to determine whether or not an interface of the first application functions correctly and/or whether or not features of the interface are displayed properly (e.g., as intended by an entity designing and/or maintaining the first application). A dynamic region may correspond to a region of an interface of the first application that has visual characteristics that change due to factors such as at least one of time (e.g., in the case of a clock that shows the time, the clock may correspond to a dynamic region since the time indicated by the clock changes throughout the day), user interactions (e.g., a dynamic region may comprise a graphical object that visually changes, such as changes color or shape, due to a selection of a button or other type of user interaction), data input to the application, etc. Examples of a dynamic region include a clock, a text field (into which a user can input text, for example), and/or one or more other dynamic features of the first application. A static region may correspond to a region of an interface of the first application that is not configured to change (e.g., is not configured to change visually). Examples of a static region include a region that comprises text (e.g., unchanging text), an image, etc. Since static regions of the first application are not configured to change (and/or are configured to change less frequently than dynamic regions), identification of a change in a static region of the first application may be reflective of a user interface error in the first application. Using one or more of the techniques herein, one or more user interface errors associated with one or more changes to one or more static regions of the first application may be detected, and/or one or more corrective actions may be performed based upon the detection of the one or more user interface errors.

FIG. 1A illustrates generation and/or storage of images of one or more interfaces of the first application. In some examples, the images may comprise screenshots of the one or more interfaces of the first application. For example, the screenshots may be captured at different times. The screenshots may be captured via one or more automated tests (e.g., automated test cases) of the first application. For example, the one or more automated tests may be executed by an automated testing module 102 (e.g., at least one of an application automation module, a browser automation module, etc.). The one or more automated tests may comprise at least one of one or more regression tests, one or more progression tests, one or more functional tests, etc. In an example, an automated test may comprise execution of operations using one or more features of the first application, such as at least one of opening a home page of the first application, opening a login page of the first application, entering login information (e.g., user credentials used for authentication) into the login page, logging into the first application with the login information, adding items to a shopping cart, checking out the items, etc. Alternatively and/or additionally, during the execution of operations, screenshots of one or more interfaces of the first application may be captured. Embodiments are contemplated in which the screenshots are captured using other techniques (e.g., the screenshots may be captured manually and/or may be captured while one or more users are interacting with the first application) and/or are not captured via the one or more automated tests.

The automated testing module 102 may output test execution information 104 based upon a test executed on the first application. For example, when the test is executed, the automated testing module 102 may generate the test execution information 104 to comprise at least one of results of the test, builds, execution status of the text, (e.g., whether or not the first application passed the test or failed the test), a results table and/or screenshots, of one or more interfaces, that are captured during execution of the test. In an example, the results of the test may be indicative of one or more errors (e.g., functional errors and/or other types of errors) detected in the first application by performing the test. In an example, the test execution information 104 may comprise one or more first screenshots 106 of a first interface "Interface 1" of the first application, one or more second screenshots 108 of a second interface "Interface 2" of the first application, one or more third screenshots 110 of a third interface "Interface 3" of the first application, etc.

In some examples, screenshots output by the automated testing module 102 may be stored in a screenshot data store 112 associated with the first application. The screenshot data store 112 may be organized by interface, such as where the screenshot data store 112 comprises a plurality of datasets (e.g., buckets) corresponding to respective interfaces of the first application. In some examples, an interface may correspond to at least a portion of the first application. For example, an interface may correspond to at least one of a section of the first application, a page of the first application, a web page of the first application, a component of the first application, etc. Screenshots of an interface may be stored in a dataset, of the plurality of datasets, associated with the interface. In an example, the one or more first screenshots 106 of the first interface may be stored in a first dataset 114 (e.g., "Interface 1 Bucket") associated with the first interface, the one or more second screenshots 108 of the second interface may be stored in a second dataset 116 (e.g., "Interface 2 Bucket") associated with the second interface, and/or the one or more third screenshots 110 of the third interface may be stored in a third dataset 118 (e.g., "Interface 3 Bucket") associated with the third interface, etc.

In some examples, the screenshot data store 112 may correspond to a bucket (e.g., a storage bucket profiled by a cloud storage service). The screenshot data store 112 may correspond to a relational database. In some examples, screenshot information associated with a screenshot may be stored in the screenshot data store 112. The screenshot information may be used to identify one or more characteristics of the screenshot. In some examples, the screenshot information may (i) identify a test executed to capture the screenshot, (ii) identify an interface, a location of the interface and/or a function of the interface captured in the screenshot (e.g., the function may correspond to one or more functions the interface can be used for, such as at least one of editing a payment method, subscribing to a service, etc.), (iii) identify a time at which the screenshot was captured, (iv) identify a group (of the plurality of groups 107 shown in FIG. 107, for example) to which the screenshot belongs, (v) indicate a set of contours (e.g., the first set of dynamic region contours 138 shown in FIGS. 1F and 1M) associated with the screenshot, (vi) identify a reference image of the interface and/or the group associated with the screenshot, and/or (vii) other information associated with the screenshot. In some examples, one, some and/or all of the screenshots and/or one, some and/or all of the plurality of datasets may be stored and/or accessed in the screenshot data store 112 using keys (e.g., unique keys) to protect the screenshot data store 112 from unauthorized access.

As tests (e.g., automated tests) of the first application are performed and/or new screenshots of interfaces of the first application are captured via the tests, the screenshot data store 112 may be updated by storing the new screenshots into datasets associated with respective interfaces. In some examples, the first dataset 114 may comprise a first plurality of images (e.g., screenshots) of the first interface of the first application. For example, the first plurality of images may comprise screenshots of the first interface captured at different times, captured via different tests and/or captured with different data input to the first application. Accordingly, images of the first plurality of images may differ from each other due to the images being captured during different tests that are performed at different times, with different data, and/or with different executed operations, etc.

Figure 2:
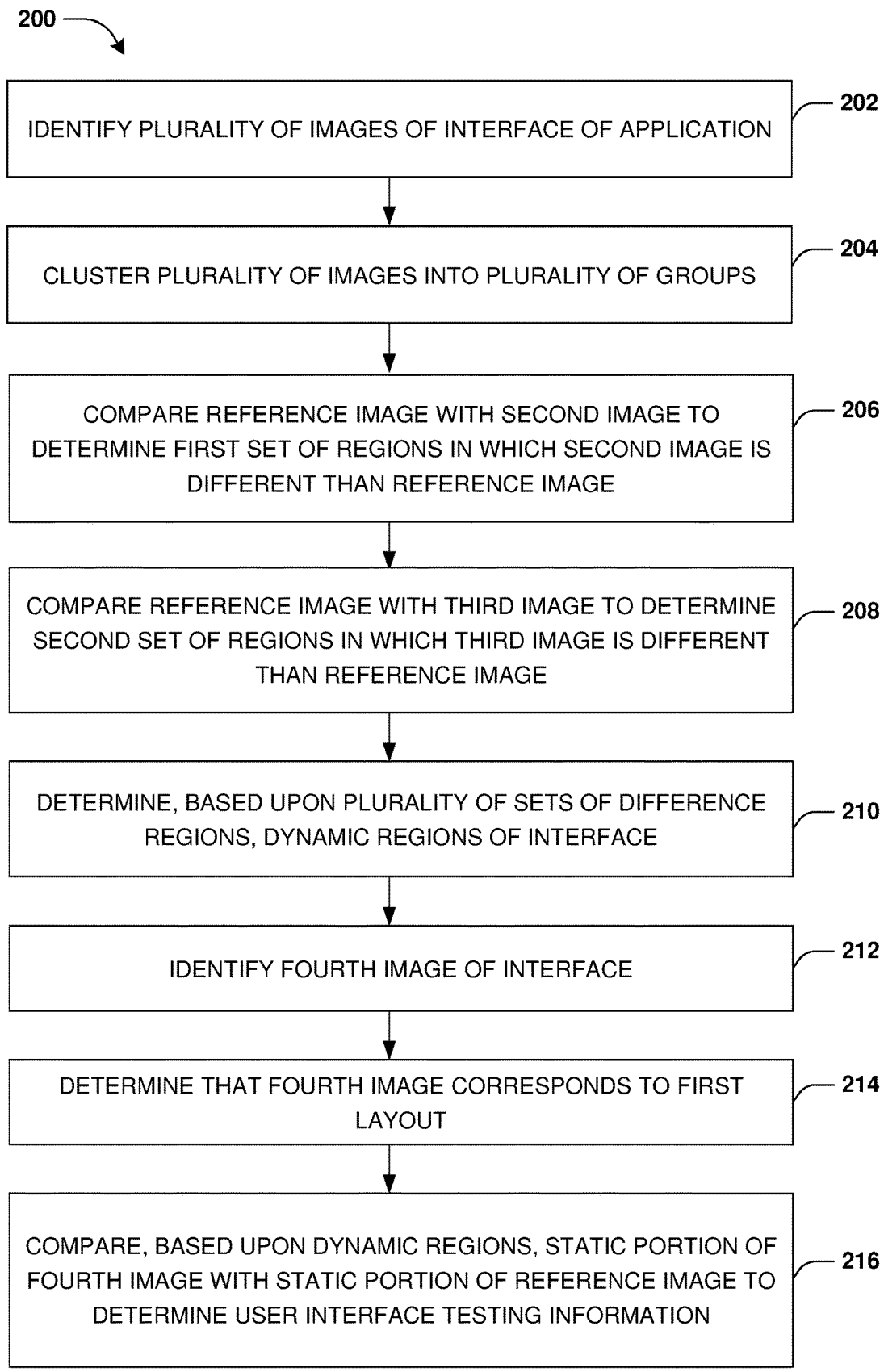
FIG. 2 is a flow chart illustrating an example method for performing user interface testing, according to some embodiments.

An embodiment of performing user interface testing is illustrated by an exemplary method 200 of FIG. 2, and is further described in conjunction with the system 101 of FIGS. 1A-1R. At 202, the first plurality of images of the first interface is identified. For example, the first plurality of images may be extracted from the screenshot data store 112 (e.g., the first plurality of images may be extracted from the first dataset 114, of the screenshot data store 112, associated with the first interface). The first plurality of images may be used to determine (e.g., learn) one or more dynamic regions of the first interface.

At 204, the first plurality of images (e.g., screenshots of the first interface may be clustered into a plurality of groups associated with layouts (e.g., different layouts) of the first interface. FIG. 1B illustrates clustering (using a clustering module 105, for example) the first plurality of images (shown with reference number 103) into the plurality of groups (shown with reference number 107). In the example shown in FIG. 1B, the plurality of groups 107 comprise a first group of images "Group 1", a second group of images "Group 2", a third group of images "Group 3", and/or one or more other groups of images.

In some examples, the plurality of groups 107 are associated with (different) layouts of the first interface. For example, the first interface's layout (e.g., structure, appearance, arrangement, etc.) may have differences in different conditions, such as due, at least in part, to (i) pixel drifting (e.g., differences in positions of pixels and/or objects between images of the same interface) and/or (ii) one or more dynamic and/or interactive elements of the first interface, such as pop-up information messages and/or other interactive elements that may change position and/or may appear, disappear, and/or reappear at different times and/or in response to one or more triggers (e.g., one or more triggers associated with at least one of time, user interactions, data input to the first application, etc.). Group 1 may comprise images associated with a first layout of the first interface, Group 2 may comprise images associated with a (different) second layout of the first interface, and/or Group 3 may comprise images associated with a (different) third layout of the first interface. In an example shown in FIG. 1E (discussed further below), the first layout may be associated with a layout of the first interface without pop-up graphical objects (e.g., Group 1 may comprise screenshots of the first interface when there aren't any pop-up graphical objects overlaying the first interface), and/or the second layout may be associated with a layout of the first interface with a pop-up graphical object 153 (e.g., Group 2 may comprise screenshots of the first interface when the pop-up graphical object 153 overlays the first interface). Other examples of differences between layouts of different groups of images include (i) differences in positions of objects between images (e.g., a button, a boundary of an object, etc. may move due to interactive elements of the first interface), (ii) differences in sizes of objects between images, (iii) differences in formatting of objects between images (e.g., in one screenshot, a set of text of the first interface has a first appearance, such as at least one of a first color, a first font, a first size, etc. whereas in another screenshot, the same set of text of the first interface has a second appearance, such as at least one of a second color, a second font, a second size, etc.), (iv) inclusion of one or more new objects in an image (e.g., adding new text or new images or other graphical objects to the first interface), (v) exclusion of one or more objects from an image (e.g., removing a part of the first interface, or overlaying it with a blank space or other object), etc.

In some examples, the first plurality of images 103 may be clustered into the plurality of groups 107 based upon a plurality of sets of features associated with the first plurality of images 103. The plurality of sets of features may comprise a set of features for each of the first plurality of images 103. In an example, a first set of features associated with a first image of the first plurality of images 103 may comprise (i) one or more comparison metrics determined by comparing the first image with a first reference image of the first plurality of images 103, (ii) a first histogram associated with the first image, (iii) a relationship between the first histogram and a second histogram associated with the first reference image, and/or (iv) one or more other features. In an example, the relationship may correspond to a degree of similarity between the first histogram and the second histogram, which may be determined by determining a Bhattacharyya coefficient (e.g., a Bhattacharyya distance between the first histogram and the second histogram). The one or more comparison metrics may comprise (i) a measure of pixel change between the first image and the first reference image (e.g., the measure of pixel change may correspond to a size, such as an area, of one or more regions, of the first interface, in which the first reference image is different than the first image with which the first reference image is compared), (ii) a measure of contour change between the first image and the first reference image (e.g., the measure of contour change may correspond to a size, such as an area, of one or more regions, of the first interface, in which there is a difference between a contour in the first reference image and/or a contour in the first image), and/or (iii) a first similarity score associated with a similarity between the first reference image and the first image.

In some examples, the first similarity score comprises a first Structural Similarity Index (SSIM) score. The first similarity score may be determined based upon one or more properties (e.g., features) comprising at least one of a luminance of the first image, a contrast of the first image, a structure of the first image, a luminance of the first reference image, a contrast of the first reference image, a structure of the first reference image, etc. The one or more properties may be extracted from the first image and/or the first reference image. In some examples, the first SSIM score may be determined according to equation (1)

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}, \quad (1)$$

where x corresponds to at least a portion of the first image, y corresponds to at least a portion of the first reference image, $\mu_x$ corresponds to the average of x, $\mu_y$ corresponds to the average of y, $\sigma_x^2$ corresponds to the variance of x, $\sigma_y^2$ corresponds to the variance of y, $\sigma_{xy}$ corresponds to the covariance of x and y, $c_1=(k_1L)^2$, $c_2=(k_2L)^2$ (e.g., $c_1$ and/or $c_2$ may be variables to stabilize division with a weak denominator), L corresponds to the dynamic range of the pixel-values (e.g., $2^{\#bits\ per\ pixel}-1$), $k_1=0.01$ (or other value) and/or $k_2=0.03$ (or other value).

In some examples, the first reference image may be selected (to be used as a base image with which other images of the first plurality of images 103 are compared, for example) from the first plurality of images 103 in a random manner (e.g., using a true random function and/or a pseudo-random function). Alternatively and/or additionally, the first reference image may be selected from the first plurality of images 103 based upon a determination that, among the first plurality of images 103, the first reference image was captured and/or generated earliest (e.g., the first reference image is the initially captured image of the first plurality of images 103). Alternatively and/or additionally, the first reference image may be selected from the first plurality of images 103 based upon a determination that the first reference image is validated (e.g., validated as being a screenshot of the first interface when the first interface is error-free), such as validated manually (by a user interface testing agent, for example) or validated automatically.

Other sets of features of the plurality of sets of features may be determined using one or more of the techniques provided herein with respect to determining the first set of features associated with the first image.

In some examples, multiple levels of clustering are performed to determine the plurality of groups 107. FIG. 1C illustrates multiple levels of clustering performed to determine the plurality of groups 107. A first clustering process 127 (e.g., level 1 clustering) may be performed (by the clustering module 105 shown in FIG. 1B, for example) based upon the plurality of sets of features to determine a second plurality of groups 129 comprising Group 1 and a fourth group of images "Group B". In some examples, whether further clustering is needed for a group of the second plurality of groups 129 may be determined based upon similarities between images in the group. If it is determined that further clustering (e.g., level 2 clustering) is not needed (such as in the case of Group 1), a group (e.g., Group 1) may be included in the plurality of groups 107 (as is) without clustering the group into sub-groups. If it is determined that further clustering (e.g., level 2 clustering) is needed (such as in the case of Group B), a group (e.g., Group B) may be clustered into sub-groups (e.g., Groups 2 and 3) via a second clustering process 131 (e.g., level 2 clustering). Whether the sub-groups need further clustering may (again) be determined. The sub-groups (e.g., Groups 2 and 3) may be included in the plurality of groups 107 without further clustering, or may be further clustered (e.g., level 3 clustering) into (further) sub-groups if further clustering is determined to be needed.

In some examples, a first quantity of groups (e.g., a first target quantity of groups) may be determined, and the first clustering process 127 may be performed based upon the first quantity of groups (e.g., the first clustering process 127 may be performed such that a quantity of groups of the second plurality of groups 129 is equal to the first quantity of groups, such as two). In some examples, the first clustering process 127 may comprise a K-means clustering process (where K is equal to the first quantity of groups, for example) in which the first plurality of images 103 are clustered into the second plurality of groups 129 (based upon the plurality of sets of features, for example). Other techniques (other than and/or in addition to K-means clustering, for example) for clustering the first plurality of images 103 into the second plurality of groups 129 are within the scope of the present disclosure.

In some examples, variance metrics associated with a plurality of quantities of groups may be determined, and the variance metrics may be used to determine the first quantity of groups (e.g., the first quantity of groups may be selected from the plurality of quantities based upon the variance metrics). In some examples, the variance metrics may be determined based upon the plurality of sets of features (and/or other information associated with the first plurality of images 103). In an example, for each of the plurality of quantities, the variance metrics may comprise a variance, a distortion, and/or an explained variation.

In some examples, an elbow method may be used to determine the first quantity of groups (e.g., select the first quantity of groups from the plurality of quantities) based upon the variance metrics. For example, the first quantity of groups may be selected based upon a determination that a variance metric associated with the first quantity of groups corresponds to an elbow of a curve associated with (e.g., representative of) the variance metrics.

FIG. 1D illustrates an example chart 111 showing example variance metrics (e.g., distortion levels) as a function of quantity of groups (e.g., K). In some examples, the plurality of quantities (e.g., values of K in the example chart 111) range from 1 to 6. Other ranges of the plurality of quantities are within the scope of the present disclosure. Curve 123 intersects with distortion levels associated with the plurality of quantities. For example, the first quantity of groups (e.g., two) may be selected from the plurality of quantities based upon a determination that a distortion level 117 of the first quantity of groups corresponds to an elbow of the curve 123. In some examples, an elbow method process may be performed to determine that the distortion level 117 of the first quantity of groups corresponds to the elbow of the curve 123 (and/or to select the first quantity of groups). The elbow method process may comprise (i) determining a line 119 between a distortion level 113 of a lowest quantity (e.g., one) of the plurality of quantities and a distortion level 115 of a highest quantity (e.g., six) of the plurality of quantities, (ii) determining distances between the line 119 and distortion levels of remaining quantities (e.g., quantities 2, 3, 4 and 5), wherein the determined distances comprise distance 121 between the distortion level 117 and the line 119, and/or (iii) identifying a largest distance among the determined distances. The first quantity of groups (e.g., two) may be selected from the plurality of quantities based upon a determination that the distance 121 between the distortion level 117 and the line 119 is the largest distance among the determined distances. Accordingly, the first clustering process 127 may be performed to output two groups (e.g., Group 1 and Group B).

FIG. 1E illustrates determining layout representations of images (e.g., screenshots of the first interface). The layout representations may be used to determine whether to cluster a group of the second plurality of groups 129 into sub-groups. In an example, the group may be clustered into the sub-groups based upon the layout representations. In the example shown in FIG. 1E, a Group 1 reference layout representation 147 is generated based upon a Group 1 reference image 124 of Group 1, and a Group 2 reference layout representation 149 is generated based upon a Group 2 reference image 143 of Group 2. The Group 1 reference layout representation 147 and/or the Group 2 reference layout representation 149 may be generated using a layout representation generation module 145.

The Group 1 reference layout representation 147 may be representative of a layout (e.g., the first layout associated with Group 1) of the Group 1 reference image 124. In some examples, the Group 1 reference image 124 may correspond to a base image with which other images are compared, and/or the Group 1 reference layout representation 147 may correspond to a base layout representation of the first layout with which other layout representations are compared. In the example shown in FIG. 1E, the first layout may be associated with a layout of the first interface without pop-up graphical objects.

The Group 2 reference layout representation 149 may be representative of a layout (e.g., the second layout associated with Group 2) of the Group 2 reference image 143. In some examples, the Group 2 reference image 143 may correspond to a base image with which other images are compared and/or the Group 2 reference layout representation 149 may correspond to a base layout representation of the second layout with which other layout representations are compared. In the example shown in FIG. 1E, the second layout may be associated with a layout of the first interface with the pop-up graphical object 153.

Accordingly, since the first layout associated with Group 1 and the second layout associated with Group 2 are different from each other (e.g., the second layout includes the pop-up graphical object 153 while the first layout does not), the Group 1 reference layout representation 147 representative of the first layout may (also) be different from the Group 2 reference layout representation 149 representative of the second layout.

In some examples, the layout representation generation module 145 may perform canny edge detection 137 on the Group 1 reference image 124 to determine (e.g., detect) edges of the Group 1 reference image 124. In some examples, the canny edge detection 137 may be performed using one or more of the techniques provided herein with respect to performing canny edge detection on the difference image 154 to determine edges of the difference image 154 (shown in FIGS. 1I-1L). For example, a first canny edge image representative of the edges of the Group 1 reference image 124 may be output via the canny edge detection 137. The first canny edge image may be generated using one or more of the techniques provided herein with respect to determining the second canny edge image 162 (shown in FIG. 1K).

In some examples, contours of the Group 1 reference image 124 may be determined based upon the edges of the Group 1 reference image 124. For example, the layout representation generation module 145 may perform contour detection 139 on the first canny edge image (representative of the edges of the Group 1 reference image 124) to determine (e.g., detect) the contours of the Group 1 reference image 124 (which may comprise contours of the first canny edge image). In some examples, the contours may correspond to boundaries of objects (e.g., edges) of the first canny edge image. For example, a contour of the contours may correspond to a curve (e.g., an irregular-shaped curve) joining continuous points (e.g., continuous points having the same color and/or the same intensity) along a boundary of an object (e.g., an edge) in the first canny edge image. The contours may be determined using one or more of the techniques provided herein with respect to determining the first set of difference region contours 134 based upon the second canny edge image 162.

In some examples, a contour filter 151 may be applied to the contours to generate a filtered set of contours. In some examples, contours with sizes smaller than a threshold size (e.g., contours with pixel areas smaller than 500 pixels or other threshold) are removed to generate the filtered set of contours (e.g., the filtered set of contours may comprise contours having sizes larger than the threshold size).

Accordingly, the filtered set of contours may comprise relatively larger contours associated with relatively larger objects (e.g., the filtered set of contours may comprise at least one of boundaries of text fields, boundaries of pop-up boxes, structural boundaries of the first interface, lines, curves and/or shapes separating different parts of the first interface, etc.), whereas relatively smaller contours associated with relatively smaller objects may be filtered out of the filtered set of contours (e.g., contours associated with text characters, small symbols, etc. may be removed due to being smaller than the threshold size). Since the larger contours may be more representative of the first interface's layout and/or structure than the smaller contours, filtering the smaller contours from the filtered set of contours may provide for increased accuracy of the Group 1 reference layout representation 147, which may be generated based upon the filtered set of contours.

Alternatively and/or additionally, the contour filter 151 may compare a first contour of the Group 1 reference image 124 with contours of other images (e.g., other images of Group 1) to determine a measure of occurrences of the first contour. In some examples, the measure of occurrences is based upon a quantity of images with contours that match the first contour (e.g., a contour of an image may match the first contour if the contour has at least one of a size, a shape, a position, etc. that is equal to or overlapping with the first contour). In some examples, the measure of occurrences may be compared with a threshold measure of occurrences. The measure of occurrences not meeting the threshold measure of occurrences may indicate that the first contour is noise. In some examples, in response to determining that the measure of occurrences does not meet the threshold measure of occurrences, the first contour may be filtered (e.g., not included in the filtered set of contours). In some examples, the contour filter 151 may include the first contour in the filtered set of contours based on the measure of occurrences meeting (e.g., exceeding) the threshold measure of occurrences.

Alternatively and/or additionally, one or more filtering parameters of the contour filter 151 (e.g., parameters used by the contour filter 151 to determine the filtered set of contours) may be adjusted based on one or more characteristics of the first application and/or the first interface. In some examples, the one or more characteristics are associated with application graphics the first application and/or the first interface. For example, the one or more characteristics may comprise at least one of one or more visual characteristics of the first application and/or the first interface, a rendering configuration of the first application and/or the first interface, graphical objects of the first application and/or the first interface, etc. In some examples, the one or more characteristics are determined using an image analysis module, which may output the one or more filtering parameters for use in determining one or more layout representations for at least one of Group 1, the first interface, the first application, etc. Accordingly, in some examples, the one or more filtering parameters may be tailored to at least one of Group 1, the first interface, the first application, etc. to provide for improved layout representations.

In some examples, the filtered set of contours may be analyzed to identify relationships between contours of the filtered set of contours, and/or the Group 1 reference layout representation 147 may be generated based upon the relationships. In an example, points at which contours intersect and/or shapes (e.g., rectangles and/or other shapes) formed from two or more intersecting contours may be identified, and/or the Group 1 reference layout representation 147 may be generated based upon the points of intersection and/or the shapes. In an example, one or more shapes (e.g., rectangles and/or other shapes) of the Group 1 reference layout representation 147 may be generated based upon the filtered set of contours (e.g., based upon the identified points and/or the identified shapes). In an example, the one or more shapes may comprise a rectangle (e.g., a minimum area rectangle) generated based upon (i) one or more contours of the filtered set of contours, (ii) a contour center point of one or more contours, and/or (iii) a box point of the one or more contours (e.g., the box point may correspond to coordinates of a rectangular contour). In some examples (e.g., shown in FIG. 1E), the one or more shapes (and/or at least some of the filtered set of contours) are drawn in an image (e.g., 3-channel image) to generate the Group 1 reference layout representation 147. In the example shown in FIG. 1E, the image (e.g., the 3-channel image) may be have a black background (e.g., the one or more shapes and/or at least some of the filtered set of contours may be drawn on the black background of the image, for example). Other colors of the image (and/or other colors of the background of the Group 1 reference layout representation 147) are within the scope of the present disclosure.

One or more of the techniques provided herein with respect to generating the Group 1 reference layout representation 147 may be used for generating other layout representations associated with other images of the first plurality of images 103.

In some examples, whether to cluster a group of the second plurality of groups 129 into sub-groups may be determined by analyzing and/or comparing layout representations corresponding to layouts of images in the group.

Returning back to FIG. 1C, in some examples, Group 1 is determined not to require further clustering based upon layout representations (comprising the Group 1 reference layout representation 147, for example) of images of Group 1. In an example, first layout similarity scores associated with similarities between the layout representations may be determined. In some examples, the first layout similarity scores may comprise similarity scores associated with similarities between the Group 1 reference layout representation 147 and other layout representations of the layout representations associated with Group 1. For example, for each layout representation other than the Group 1 reference layout representation 147, the layout representation may be compared with the Group 1 reference layout representation 147 to determine a layout similarity score corresponding to a similarity between the layout representation and the Group 1 reference layout representation 147. The layout similarity score may comprise a SSIM score, and/or may be determined using one or more of the techniques provided herein with respect to determining the first similarity score and/or a second similarity score (e.g., the second similarity score may be further discussed below, and/or may be associated with a similarity between a static portion of a fourth image 172 and a static portion of a Group 1 reference image 124). Alternatively and/or additionally, the layout similarity score may be determined by comparing pixels of the layout representation with pixels of the Group 1 reference layout representation 147. In an example, the layout similarity score may comprise a pixel to pixel comparison score. In some examples, the first layout similarity scores may correspond to similarities between layouts of Group 1. In some examples, the clustering module 105 may determine not to cluster Group 1 into sub-groups based upon one, some and/or all of the first layout similarity scores meeting a threshold and/or satisfying one or more conditions. In an example, one, some and/or all of the first layout similarity scores meeting the threshold and/or satisfying the one or more conditions may indicate that images of Group 1 share the (same) first layout of the first interface. Accordingly, Group 1 may be included in the plurality of groups 107 without clustering Group 1 into sub-groups.

Group B, however, may be determined to require further clustering based upon layout similarity scores associated with layout representations of images of Group B. For example, the clustering module 105 may determine to cluster Group B into sub-groups (e.g., Group 2 and Group 3 in FIG. 1C) based upon one, some and/or all of the layout similarity scores associated with Group B not meeting a threshold and/or not satisfying one or more conditions. In an example, one, some and/or all of the layout similarity scores associated with Group B not meeting the threshold and/or not satisfying the one or more conditions may indicate that images of Group B have layouts that may (significantly) differ from each other. In an example, the clustering module 105 may determine to cluster Group B into sub-groups based upon a layout similarity score associated with Group B not meeting a threshold (e.g., the layout similarity score being lower than the threshold, which may be equal to 1 or other value, may indicate that layouts of different images of Group B are (significantly) different from each other). Alternatively and/or additionally, the clustering module 105 may determine to cluster Group B into sub-groups based upon a threshold quantity of layout similarity scores associated with Group B not meeting a threshold. Alternatively and/or additionally, the clustering module 105 may combine the layout similarity scores associated with Group B to determine one or more values (e.g., at least one of an average, a variance, a standard deviation, etc. of the layout similarity scores), and/or may determine to cluster Group B into sub-groups based upon the one or more values (e.g., based upon the one or more values not meeting one or more thresholds).

In some examples, in response to determining to cluster Group B, Group B may be clustered into sub-groups (e.g., Groups 2 and 3) via the second clustering process 131 (e.g., level 2 clustering). In some examples, the second clustering process 131 may be performed based upon the layout representations of images of Group B. For example, the second clustering process 131 may be performed based upon the layout similarity scores associated with Group B. In some examples, a second quantity of groups (e.g., a second target quantity of groups) associated with the second clustering process 131 may be determined using one or more of the techniques provided herein with respect to determining the first quantity of groups. Alternatively and/or additionally, the second quantity of groups may be based upon the first quantity of groups (e.g., the second quantity of groups may be set to the same value as the first quantity of groups such that both the first clustering process 127 and the second clustering process 131 produce the same quantity of groups). Alternatively and/or additionally, the second quantity of groups may be set to a defined (e.g., predefined) value.

It may be appreciated that the techniques provided herein for clustering the first plurality of images 103 into the plurality of groups 107 may be implemented in other ways different from the examples explicitly set forth herein. In some examples, the first plurality of images 103 may be clustered into the plurality of groups 107 based upon the plurality of sets of features associated with the first plurality of images 103 and/or layout representations of the first plurality of images 103.

In accordance with some embodiments, the clustering module 105 may comprise a machine learning model used for clustering the first plurality of images 103 into the plurality of groups 107. In some examples, the machine learning model may comprise at least one of a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model (e.g., a K-means clustering model for performing one or more K-means clustering processes), a random forest model, a machine learning model used to perform dimensional reduction, a machine learning model used to perform gradient boosting, a neural network model (e.g., a deep neural network model and/or a convolutional neural network model), etc.

In some examples, when the plurality of groups 107 are determined, one or more of the techniques of the present disclosure may be used to determine sets of dynamic regions and/or static regions associated with the (different) layouts associated with the plurality of groups 107. In an example, a first set of dynamic regions (e.g., a set of one or more dynamic regions) of the first interface (e.g., of the first layout of the first interface) may be determined based upon images of Group 1, a second set of dynamic regions of the first interface (e.g., of the second layout of the first interface) may be determined based upon images of Group 2, and/or a third set of dynamic regions of the first interface (e.g., of the third layout of the first interface) may be determined based upon images of Group 3. The dynamic regions may be used to determine user interface testing information (associated with the layouts of the first interface, for example).

FIG. 1F illustrates determination of the first set of dynamic regions of the first layout (e.g., dynamic regions of the first layout of the first interface). For example, a first set of dynamic region contours 138, indicative of the first set of dynamic regions, may be generated. The first set of dynamic region contours 138 may comprise boundaries of the first set of dynamic regions. In some examples, the first set of dynamic region contours 138 may be indicative of coordinates (e.g., positional coordinates, such as X coordinates and/or Y coordinates) of boundaries of the first set of dynamic regions.

In some examples, Group 1 may comprise the Group 1 reference image 124 and a second plurality of images 130 other than the Group 1 reference image 124. The second plurality of images 130 may comprise some and/or all images, of Group 1, other than the Group 1 reference image 124. In some examples, the Group 1 reference image 124 may be selected (to be used as a base image with which other images of Group 1 are compared, for example) from Group 1 using one or more of the techniques provided herein with respect to selecting the first reference image (to be used as a base image with which other images of the first plurality of images 107 are compared, for example). The Group 1 reference image 124 may be the same as or different than the first reference image.

In some examples, the Group 1 reference image 124 is compared with each image of the second plurality of images 130 to determine a plurality of sets of difference regions. For example, each set of difference regions of the plurality of sets of difference regions may comprise one or more regions, of the first interface, in which the Group 1 reference image 124 is different than an image with which the Group 1 reference image 124 is compared. The plurality of sets of difference regions may be determined by a comparison module 126. In an example, the comparison module 126 may generate a plurality of sets of difference region contours 132, wherein each set of difference region contours of the plurality of sets of difference region contours 132 is indicative of a set of difference regions of the plurality of sets of difference regions (e.g., the set of difference region contours may comprise boundaries of the set of difference regions).

Returning back to the flow diagram of FIG. 2, at 206, the Group 1 reference image 124 is compared (by the comparison module 126, for example) with a second image 128 of the second plurality of images 130 to determine a first set of difference regions, of the first interface, in which the second image 128 is different than the Group 1 reference image 124. For example, the comparison module 126 may generate a first set of difference region contours 134, of the plurality of sets of difference region contours 132, indicative of the first set of difference regions (e.g., first set of one or more difference regions). In some examples, the first set of difference region contours 134 may be indicative of coordinates (e.g., positional coordinates, such as X coordinates and/or Y coordinates) of boundaries of the first set of difference regions.

At 208, the Group 1 reference image 124 is compared (by the comparison module 126, for example) with a third image of the second plurality of images 130 to determine a second set of difference regions, of the first interface, in which the third image is different than the Group 1 reference image 124. For example, the comparison module 126 may generate a second set of difference region contours, of the plurality of sets of difference region contours 132, indicative of the second set of difference regions (e.g., second set of one or more difference regions). In some examples, the second set of difference region contours may be indicative of coordinates (e.g., positional coordinates, such as X coordinates and/or Y coordinates) of boundaries of the second set of difference regions.

Accordingly, the plurality of sets of difference region contours 132 may comprise the first set of difference region contours 134 based upon the comparison of the Group 1 reference image 124 with the second image 128, the second set of difference region contours based upon the comparison of the Group 1 reference image 124 with the third image, and/or one or more other sets of difference region contours based upon one or more comparisons of the Group 1 reference image 124 with one or more other images of the second plurality of images 130.

In some examples, at least some images of Group 1 (comprising the Group 1 reference image 124 and/or the second plurality of images 130) may be resized (prior to being compared to generate the plurality of sets of difference region contours 132, for example) such that images of Group 1 have at least one of the same size, the same number of pixels, the same dimensions, etc. In this way, the images of Group 1 are comparable to each other, and thus, the plurality of sets of difference region contours 132 may be generated accurately. In an example, each image of Group 1 may have the same size, such as a size of 1000 pixels×1000 pixels or other size (e.g., all images of Group 1 may be automatically resized to be the same size).

At 210, the first set of dynamic regions is determined based upon the plurality of sets of difference regions. For example, the first set of dynamic region contours 138 (indicative of boundaries of the first set of dynamic regions) may be generated, by a dynamic region determination module 136, based upon the plurality of sets of difference region contours 132. In some examples, the first set of dynamic regions comprises the plurality of sets of difference regions. For example, the plurality of sets of difference regions may be combined to determine the first set of dynamic regions.

FIG. 1G illustrates an example of the Group 1 reference image 124. In the example shown in FIG. 1G, the first interface of the first application corresponds to an interface, of the first application, for signing up for an account of the first application. The first interface of the first application may comprise one or more text fields, one or more identifications of the one or more text fields (e.g., the one or more identifications may comprise a first indication "Username" identifying a username text field to be used for entering a username of a user account, a second indication "First Name" identifying a first name text field to be used for entering a first name of a user of a user account, etc.), a check box (e.g., tick box) to be used for making a binary choice (e.g., whether or not to receive promotional emails), descriptive text, and/or one or more buttons (e.g., a sign up button and/or a close button).

FIG. 1H illustrates an example of the second image 128. The second image 128 may have one or more differences with the Group 1 reference image 124. For example, in the second image 128, text may be displayed within one or more text fields of the first interface (e.g., "TitaniumBikes" may be within the username text field, "John" may be within the first name text field, etc.). For example, the text may be entered into the one or more text fields by the automated testing module 102. Alternatively and/or additionally, a check may be displayed overlaying the check box (e.g., the check may be displayed based upon a selection of the check box, wherein the check box may be selected by the automated testing module 102).

FIG. 1I illustrates generation of a difference image 154 based upon the Group 1 reference image 124 and the second image 128. In some examples, the Group 1 reference image 124 is converted to a first gray-scale image 148 and/or the second image 128 is converted to a second gray-scale image 150. The first gray-scale image 148 and/or the second gray-scale image 150 may be generated using a gray-scale conversion module 146. In some examples, the gray-scale conversion module 146 may convert a 3-dimensional image (e.g., 3 dimensions corresponding to Red Green Blue (RGB)) or a 4-dimensional image to a 2-dimensional image (e.g., black and white). In some examples, the gray-scale conversion module 146 may convert an image to a gray-scale image by applying a threshold to pixels of the image, such as where pixels that have a value that meets the threshold (e.g., a value larger than or equal to 128) is set to a first value and pixels that have a value that is less than the threshold (e.g., a value smaller than 128) is set to a second value (e.g., the first value and the second value may correspond to different colors, such as where the first value corresponds to black and the second value corresponds to white, or vice versa). Accordingly, the first gray-scale image 148 and/or the second gray-scale image 150 may be binary images with two colors, such as black and white.

In some examples, a comparison (e.g., a pixel to pixel comparison) of the first gray-scale image 148 and the second gray-scale image 150 may be performed to generate the difference image 154 representative of differences between the first gray-scale image 148 and the second gray-scale image 150. For example, the comparison (e.g., the pixel to pixel comparison) may be performed using a pixel to pixel comparison module 152. In some examples, the difference image 154 may be indicative of pixel locations at which pixels of the first gray-scale image 148 and pixels of the second gray-scale image 150 have different colors (and/or different shades of color). In some examples, converting the Group 1 reference image 124 and the second image 128 to gray-scale images and/or using the gray-scale images to determine the pixel locations and/or generate the difference image 154 may result in increased accuracy of the determined pixel locations and/or the difference image 154 (as opposed to determining the pixel locations and/or the difference image 154 directly based upon the Group 1 reference image 124 and the second image 128, for example). Embodiments are contemplated in which the gray-scale images are not generated and/or in which the pixel locations and/or the difference image 154 are determined directly based upon the Group 1 reference image 124 and the second image 128.

FIG. 1J illustrates an example of the difference image 154 representative of differences between the first gray-scale image 148 and the second gray-scale image 150. For example, the difference image 154 may be indicative of pixel locations at which pixels of the first gray-scale image 148 and pixels of the second gray-scale image 150 have different colors (and/or different shades of color). In the example shown in FIG. 1J, the differences indicated by the difference image 154 correspond to text entered into one or more text fields of the first interface and/or the check displayed overlaying the check box. In some examples, the difference image 154 may be a binary image with two colors, such as black and white.

In some examples, the first set of difference regions (e.g., one or more regions of the first interface in which the second image 128 is different than the Group 1 reference image 124) may be determined based upon the difference image 154 (e.g., the first set of difference region contours 134, indicative of the first set of difference regions, may be generated based upon the difference image 154).

FIG. 1K illustrates generation of the first set of difference region contours 134 based upon the difference image 154. In some examples, canny edge detection may be performed on the difference image 154 to determine (e.g., detect) edges of the difference image 154. For example, the canny edge detection may be performed by a canny edge detector 160 that outputs a second canny edge image 162 representative of the edges of the difference image 154.

In some examples, the canny edge detection (performed on the difference image 154 to determine edges of the difference image 154) comprises removing (and/or reducing) noise in the difference image 154, such as using a Gaussian filter (e.g., a 5×5 Gaussian filter), to generate a noise-filtered image (e.g., a smoothened image). In some examples, the canny edge detection comprises filtering the noise-filtered image with a Sobel kernel in the horizontal direction and/or the vertical direction to generate a horizontal derivative image (corresponding to a derivative of the noise-filtered image in the horizontal direction) and/or a vertical derivative image (corresponding to a derivative of the noise-filtered image in the vertical direction). An edge gradient and/or direction for a pixel of the noise-filtered image may be determined based upon the horizontal derivative image and/or the vertical derivative image. For example, an edge gradient of a pixel of the noise-filtered image may be determined according to equation (2):

$$\text{Edge\_Gradient}(G) = \sqrt{G_x^2 + G_y^2}, \quad (2)$$

where G corresponds to the pixel, $G_x$ corresponds to a horizontal derivative of the pixel (as indicated by the horizontal derivative image, for example), and/or $G_y$ corresponds to a vertical derivative of the pixel (as indicated by the vertical derivative image, for example). In some examples, a direction of the pixel may be determined according to equation (3):

$$\text{Angle } (\theta) = \tan^{-1}\left(\frac{G_y}{G_x}\right). \quad (3)$$

In some examples, gradients (e.g., gradient magnitudes) and/or directions of some and/or all pixels of the noise-filtered image may be determined (according to equation (2) and/or equation (3), for example). Hysteresis thresholding may be performed to identify edge pixels (e.g., pixels corresponding to edges of the noise-filtered image) and/or non-edge pixels (e.g., pixels determined to not correspond to edges of the noise-filtered image). In some examples, gradients of pixels of the noise-filtered image may be compared with a first threshold (e.g., minVal) and/or a second threshold (e.g., maxVal). Pixels having gradients less than the first threshold may be determined to be non-edge pixels. Pixels having gradients larger than the second threshold may be determined to be edge pixels. In some examples, in response to a determination that a gradient of a pixel is between the first threshold and the second threshold, whether the pixel is an edge pixel or a non-edge pixel may be determined based upon a connectivity of the pixel. For example, the pixel (with the gradient between the first threshold and the second threshold) may be determined to be an edge pixel if the pixel is connected to a pixel (e.g., a sure-edge pixel) with a gradient larger than the second threshold. The pixel (with the gradient between the first threshold and the second threshold) may be determined to be a non-edge pixel if the pixel is not connected to a pixel with a gradient larger than the second threshold. In some examples, edge pixels are kept and/or non-edge pixels are discarded to generate the second canny edge image 162. Alternatively and/or additionally, the edge pixels may be set to a first color in the second canny edge image 162 and/or the non-edge pixels may be set to a second color in the second canny edge image 162. In some examples, the second canny edge image 162 may be a binary image with two colors, such as black and white. In an example, the first color is white and the second color is black. Alternatively and/or additionally, the first color may be black and the second color may be white. Other colors of the first color and/or the second color are within the scope of the present disclosure.

In some examples, the first threshold (e.g., minVal) may be different than the second threshold (e.g., maxVal), such as where the first threshold is smaller than the second threshold. In an example, the first threshold is 16 and the second threshold is 51. Other values of the first threshold and/or the second threshold are within the scope of the present disclosure.

In some examples, the first threshold (e.g., minVal) may be the same as the second threshold (e.g., maxVal). In an example, the first threshold and the second threshold are 128.

In some examples, the first set of difference region contours 134 may be generated based upon the second canny edge image 162. For example, the first set of difference region contours 134 may be generated based upon edges indicated by the second canny edge image 162. For example, the first set of difference region contours 134 may correspond to boundaries of one or more difference regions of the first set of difference regions. In some examples, the first set of difference region contours 134 may be generated by a contour detector 164 that receives the second canny edge image 162 as an input and generates the first set of difference region contours 134 based upon the second canny edge image 162. In some examples, the second canny edge image 162 being a binary image with two colors provides for increased accuracy with which the first set of difference region contours 134 is generated by the contour detector 164. In some examples, the second canny edge image 162 may comprise edges in white (and the rest of the second canny edge image 162 in black, for example) to increase the accuracy with which the first set of difference region contours 134 is generated by the contour detector 164. Embodiments are contemplated in which rather than (or in addition to) the contour detector 164 generating the first set of difference region contours 134 based upon the second canny edge image 162, the contour detector 164 generate the first set of difference region contours 134 based upon information different than the second canny edge image 162, such as based upon information comprising the difference image 154. In an example in which the contour detector 164 generates the first set of difference region contours 134 based upon the difference image 154, the difference image 154 being a binary image with two colors provides for increased accuracy with which the first set of difference region contours 134 is generated by the contour detector 164. In some examples (such as where the contour detector 164 generates the first set of difference region contours 134 based upon the difference image 154), the difference image 154 may comprise representations of differences in white (and the rest of the difference image 154 in black, for example) to increase the accuracy with which the first set of difference region contours 134 is generated by the contour detector 164.

In some examples, the contour detector 164 detects a set of contours along boundaries of objects (e.g., edges) of the second canny edge image 162. A contour of the set of contours may correspond to a curve (e.g., an irregular-shaped curve) joining continuous points (e.g., continuous points having the same color and/or the same intensity) along a boundary of an object (e.g., an edge) in the second canny edge image 162. In some examples, the first set of difference region contours 134 is based upon the set of contours. For example, the first set of difference region contours 134 may be the same as the set of contours. Alternatively and/or additionally, the set of contours may be modified to generate the first set of difference region contours 134. In some examples, a contour of the first set of difference region contours 134 is a rectangular-shaped contour that defines a region in which one or more contours of the set of contours is positioned. For example, one, some and/or all contours of the first set of difference region contours 134 may be rectangular-shaped contours. Generating the first set of difference region contours 134 may comprise converting irregular-shaped contours (e.g., the set of contours detected by the contour detector 164) to the first set of difference region contours 134 (e.g., rectangular-shaped contours). In an example, a rectangular-shaped contour of the first set of difference region contours 134 may be generated (e.g., drawn) based upon contour edges of one or more contours of the set of contours and/or one or more center points of the one or more contours. In some examples, a rectangular-shaped contour of the first set of difference region contours 134 may be indicative of coordinates (e.g., positional coordinates, such as X coordinates and/or Y coordinates) of a rectangle. It may be appreciated that generating the first set of difference region contours 134 to be rectangular-shaped contours (and/or other shapes) provides for increased accuracy in generating the first set of dynamic region contours 138. Alternatively and/or additionally, the first set of difference region contours 134 (e.g., rectangular-shaped contours) may be increased in size (e.g., increased in length and/or width) so that the first set of dynamic regions defined by the resulting first set of dynamic region contours 138 (that is generated using the first set of difference region contours 134 and/or other sets of difference regions) encompass a larger area of the first interface, thereby reducing the likelihood of detecting false positive errors in the first interface (that may otherwise be detected if the first set of difference region contours 134 were the same as the set of contours detected by the contour detector 164, for example).

In some examples, the first set of difference region contours 134 is generated using one or more computer vision techniques. For example, the first set of difference region contours 134 may be generated using a contour detection function, such as a contour detection function of OpenCV.

FIG. 1L illustrates an example of the first set of difference region contours 134. For clarity, FIG. 1L shows the first set of difference region contours 134 overlaying the difference image 154 (so that positions of the contours are shown relative to the differences indicated by the difference image 154). Each contour of the first set of difference region contours 134 corresponds to a boundary of a region (of the first set of difference regions) in which the second image 128 is different than the Group 1 reference image 124. Contours of the first set of difference region contours 134 may be generated to be rectangular.

In some examples, each set of difference region contours of one, some and/or all sets of difference region contours (other than the first set of difference region contours 134) of the plurality of sets of difference region contours 132 may be generated using one or more of the techniques provided herein with respect to generating the first set of difference region contours 134. For example, a plurality of iterations may be performed to (iteratively) generate the plurality of sets of difference region contours 132. In some examples, each iteration of the plurality of iterations comprises comparing an image of the second plurality of images 130 with the Group 1 reference image 124 to determine a set of difference region contours. In some examples, upon completion of each iteration of the plurality of iterations, a determined set of difference region contours may be added to a list of difference region contours that is used for generating and/or updating the first set of dynamic region contours 138. For example, upon completion of the plurality of iterations, the list of difference region contours may comprise the plurality of sets of difference region contours 132.

In some examples, the first set of dynamic region contours 138 (indicative of boundaries of the first set of dynamic regions) is generated based upon the plurality of sets of difference region contours 132. For example, the first set of dynamic region contours 138 may be generated based upon coordinates (e.g., positional coordinates, such as X coordinates and/or Y coordinates) of difference region contours of the plurality of sets of difference region contours 132. In some examples, the plurality of sets of difference regions may be combined to determine the first set of dynamic regions (e.g., the first set of dynamic regions may correspond to a combination, such as a sum, of the plurality of sets of difference regions). In some examples, the first set of dynamic region contours 138 may be generated such that regions (e.g., dynamic regions) within the first set of dynamic region contours 138 comprise difference regions (e.g., all difference regions) indicated by the plurality of sets of difference region contours 132. For example, the first set of dynamic region contours 138 may be generated such that the regions (e.g., dynamic regions) within the first set of dynamic region contours 138 comprise the first set of difference regions determined based upon a comparison of the Group 1 reference image 124 with the second image 128, the second set of difference regions determined based upon a comparison of the Group 1 reference image 124 with the third image, and/or other sets of difference regions determined based upon comparisons of the Group 1 reference image 124 with other images of the second plurality of images 130. In this way, regions (e.g., difference regions) in which differences in the first interface are detected may be indicated as being dynamic by the first set of dynamic region contours 138. In some examples, a contour of the first set of dynamic region contours 138 may be generated to have a rectangular shape.

FIG. 1M illustrates an example of the first set of dynamic region contours 138. For clarity, FIG. 1M shows the first set of dynamic region contours 138 overlaying the Group 1 reference image 124 (so that positions of the contours are shown relative to the Group 1 reference image 124). As shown in FIG. 1M, the first set of dynamic region contours 138 may correspond to boundaries of dynamic regions comprising text fields of the first interface (in which text can be entered and displayed) and/or the check box of the first interface (in which a check can be entered and displayed).

In some examples, after the first set of dynamic region contours 138 is initially generated and/or used for user interface testing, the first set of dynamic region contours 138 may be updated based upon received images (e.g., newly received screenshots of the first interface from the automated testing module 102). For example, in response to a received image (e.g., a newly received screenshot of the first interface from the automated testing module 102), a set of difference region contours may be generated based upon a comparison of the received image with the Group 1 reference image 124 (such as using one or more of the techniques provided herein with respect to generating the first set of difference region contours 134), wherein the set of difference region contours may be used to update the first set of dynamic region contours 138, thus providing for increased accuracy of the first set of dynamic region contours 138 and/or user interface testing performed using the first set of dynamic region contours 138.

Returning back to the flow diagram of FIG. 2, at 212, a fourth image of the first interface may be identified. In some examples, the fourth image of the first interface may comprise a screenshot of the first interface captured via one or more second automated tests of the first application. For example, the one or more second automated tests may be executed by a second automated testing module. The second automated testing module may be the same as or different than the automated testing module 102. The one or more second automated tests may comprise at least one of one or more regression tests, one or more progression tests, one or more functional tests, etc. In some examples, the one or more second automated tests may be performed as part of a testing function that is executed on the first application periodically to ensure that the first application functions properly over time. Alternatively and/or additionally, the one or more second automated tests may be performed after a (new) feature is implemented (e.g., added) in the first application to check whether or not implementation of the feature has an unintended and/or detrimental impact on one or more interfaces of the first application. Alternatively and/or additionally, the one or more second automated tests may be performed after a (new) version of the first application is implemented, such as after a (new) application build is implemented, after a (new) release of the first application is implemented, and/or after an application update of the first application is implemented. Embodiments are contemplated in which the fourth image comprises a screenshot that is captured using other techniques (e.g., the screenshot may be captured manually and/or may be captured while one or more users are interacting with the user interface of the first application). In some examples, the screenshot (e.g., the fourth image) may be captured after a (new) feature is implemented (e.g., added) in the first application, after a (new) version of the first application is implemented, after a (new) application build is implemented, after a (new) release of the first application is implemented, and/or after an application update of the first application is implemented.

FIG. 1N illustrates an example of the fourth image (shown with reference number 172) of the first interface. In the fourth image 172, text may be displayed within one or more text fields of the first interface (e.g., "Timtasticbikes" may be within the username text field, "Tim" may be within the first name text field, etc.). For example, the text may be entered into the one or more text fields by the second automated testing module.

Returning back to the flow diagram of FIG. 2, at 214, the fourth image 172 may be determined to correspond to the first layout (associated with Group 1) of the first interface. In some examples, a layout of the fourth image 172 may be compared with layouts of the plurality of groups 107 to determine which layout the fourth image 172 corresponds to (e.g., which group of the plurality of groups 107 the fourth image 172 belongs to) and/or whether the layout of the fourth image 172 corresponds to a layout of a group (e.g., any group) of the plurality of groups 107.

FIG. 1O illustrates determining which layout the fourth image 172 corresponds to (e.g., which group of the plurality of groups 107 the fourth image 172 belongs to). In an example, the layout representation generation module 145 may be used to generate a third layout representation 161 based upon the fourth image 172. A layout determination module 163 may receive the third layout representation 161 associated with the fourth image 172 as an input, and/or may output an indication 167 of a layout (e.g., the first layout associated with Group 1) corresponding to the fourth image 172. In some examples, the layout determination module 163 may compare the third layout representation 161 with reference layout representations 165 of the plurality of groups 107. For example, the reference layout representations 165 may comprise a layout representation for each group of the plurality of groups 107 (e.g., the reference layout representations 165 may comprise the Group 1 reference layout representation 147 for Group 1, the Group 2 reference layout representation 149 for Group 2, a Group 3 reference layout representation for Group 3, etc.). The layout determination module 163 may determine second layout similarity scores associated with similarities between the third layout representation 161 (associated with the fourth image 172) and the reference layout representations 165 (associated with layouts of the plurality of groups 107). The second layout similarity scores may comprise a SSIM score, and/or may be determined using one or more of the techniques provided herein with respect to determining the first similarity score, the second similarity score and/or the first layout similarity scores. Alternatively and/or additionally, the second layout similarity scores may be determined by comparing pixels of the third layout representation 161 with pixels of the reference layout representations 165. In an example, the second layout similarity scores may comprise pixel to pixel comparison scores. In an example, the second layout similarity scores may comprise a Group 1 layout similarity score (corresponding to a similarity between the third layout representation 161 associated with the fourth image 172 and the Group 1 reference layout representation 147), a Group 2 layout similarity score (corresponding to a similarity between the third layout representation 161 associated with the fourth image 172 and the Group 2 reference layout representation 149), a Group 3 layout similarity score (corresponding to a similarity between the third layout representation 161 associated with the fourth image 172 and the Group 3 reference layout representation associated with the third layout of Group 3), and/or one or more other reference layout similarity scores associated with one or more other groups of the plurality of groups 107.

In some examples, the layout determination module 163 may determine that the fourth image 172 corresponds to the first layout (associated with Group 1) of the first interface based upon (i) the Group 1 layout similarity score being the highest layout similarity score among the second layout similarity scores, and/or (ii) the Group 1 layout similarity score meeting (e.g., exceeding) a threshold layout similarity score. In some examples, none of the second layout similarity scores meeting the threshold layout similarity score may be indicative of a layout of the fourth image 172 not matching a layout of any group of the plurality of groups 107 (e.g., the fourth image 172 captures a new (and/or unique) layout of the first interface).

In some examples, in response to determining that the fourth image 172 corresponds to the first layout associated with Group 1, the Group 1 reference image 124 and/or the first set of dynamic regions (associated with Group 1) may be used for comparison with the fourth image 172 and/or to determine user interface testing information associated with the first interface.

Returning back to the flow diagram of FIG. 2, at 216, based upon the first set of dynamic regions (indicated by the first set of dynamic region contours 138), a static portion of the fourth image 172 may be compared with a static portion of the Group 1 reference image 124 to determine user interface testing information associated with the first interface of the first application. For example, the static portion of the fourth image 172 may be compared with the static portion of the Group 1 reference image 124 (based upon the first set of dynamic regions, for example) in response to determining that the fourth image 172 corresponds to the first layout associated with Group 1. In some examples, the static portion of the Group 1 reference image 124 and/or the static portion of the fourth image 172 may correspond to a set of static regions (e.g., a set of one or more static regions) of the first interface (e.g., the first layout of the first interface). The set of static regions may comprise one or more regions of the first interface different than (e.g., separate from) the first set of dynamic regions. For example, the set of static regions may comprise a region of the first interface that is configured to be static (e.g., unchanging) and/or that is configured to change less frequently than dynamic regions of the first interface. By comparing the static portion of the fourth image 172 with the static portion of the Group 1 reference image 124, it may be determined whether or not there is a difference, in the set of static regions of the first interface, between the fourth image 172 and the Group 1 reference image 124.

In some examples, comparing the static portion of the fourth image 172 with the static portion of the Group 1 reference image 124 comprises: (i) removing a dynamic portion, of the fourth image 172, corresponding to the first set of dynamic regions to generate a fifth image (and/or setting the dynamic portion of the fourth image 172 to a predefined color to generate the fifth image); (ii) removing a dynamic portion, of the Group 1 reference image 124, corresponding to the first set of dynamic regions to generate a sixth image (and/or setting the dynamic portion of the Group 1 reference image 124 to a predefined color to generate the sixth image); and/or (iii) comparing the fifth image with the sixth image to determine the user interface testing information.

FIG. 1P illustrates the static portion of the fourth image 172 being compared with the static portion of the Group 1 reference image 124 to determine the user interface testing information (shown with reference number 180). In the example shown in FIG. 1P, the fifth image (shown with reference number 176) may be compared with the sixth image (shown with reference number 174) using a second comparison module 178. The second comparison module 178 may be the same as or different than the comparison module 126.

The fifth image 176 comprises the static portion, of the fourth image 172, corresponding to the set of static regions of the first interface. The fifth image 176 may exclude the dynamic portion, of the fourth image 172, corresponding to the first set of dynamic regions of the first interface (e.g., the text fields and/or the check box of the first interface are not included in the fifth image 176).

The sixth image 174 comprises the static portion, of the Group 1 reference image 124, corresponding to the set of static regions of the first interface. The sixth image 174 may exclude the dynamic portion, of the Group 1 reference image 124, corresponding to the set of dynamic regions of the first interface (e.g., the text fields and/or the check box of the first interface are not included in the sixth image 174).

In some examples, the user interface testing information 180 is indicative of whether or not the first interface has a user interface error. A user interface error may be detected via detection of a difference between the fifth image 176 (comprising the static portion of the fourth image 172) and the sixth image 174 (comprising the static portion of the Group 1 reference image 124). It may be appreciated that by comparing the fifth image 176 (comprising the static portion of the fourth image 172 and excluding the dynamic portion of the fourth image 172, for example) with the sixth image 174 (comprising the static portion of the Group 1 reference image 124 and excluding the dynamic portion of the Group 1 reference image 124, for example) to generate the user interface testing information 180, a user interface error of the first interface may be detected with increased accuracy compared to a system (and/or person) that does not differentiate between dynamic regions and static regions of interfaces that are tested. The increased accuracy of the user interface testing information 180 may be due, at least in part, to the second comparison module 178 focusing on the set of static regions of the first interface to detect potential user interface errors. For example, not differentiating between dynamic regions and static regions of interfaces that are tested may result in detection of false-positive errors based on differences between dynamic regions of an interface, where the false-positive errors may require an agent to manually check the false-positive error, thus leading to a waste of time and/or resources. However, in accordance with one or more of the embodiments provided herein, even where there is a difference in dynamic regions of the first interface (e.g., as shown in FIG. 1G and FIG. 1N, there is a difference between the Group 1 reference image 124 and the fourth image 172 in the text fields of the first interface), a false-positive error is not detected due to differences in dynamic regions of the first interface being disregarded when determining the user interface testing information 180.

In some examples, the user interface testing information 180 may be indicative of a first user interface error of the first interface (detected in the fourth image 172 and/or the fifth image 176, for example). The first user interface error may be determined based upon detection of a difference between the static portion of the fourth image 172 (included in the fifth image 176, for example) and the static portion of the Group 1 reference image 124 (included in the sixth image 174, for example). In an example, the difference between the fifth image 176 and the sixth image 174 may be detected by comparing the fifth image 176 with the sixth image 174 (via pixel to pixel comparison, for example). In some examples, the difference may comprise at least one of a feature (e.g., a graphical object, a button, text, etc.) of the first interface having an incorrect size, an incorrect position, an incorrect color, etc. in the fourth image 172 and/or the feature not being displayed in the fourth image 172. In the example shown in FIG. 1P, the difference may correspond to a lack of a button 182 of the first interface in the fourth image 172, whereas the Group 1 reference image 124 of the first interface displays the button 182. For example, due to an error of the first application (e.g., an error caused by modification to software of the first application, such as in an update of the first application) the button 182 may not be rendered by the first interface when the fourth image 172 of the first interface is captured (via the one or more second automated tests, for example). In some examples, determining the user interface testing information 180 based upon the fourth image 172 may be performed to validate the first interface and/or to check whether or not the modification to the software of the first application (e.g., an update implemented on the first application) causes one or more errors on the user interface of the first interface. For example, the user interface testing information 180 may be performed in a user interface test (e.g., a regression test) performed (to validate the first interface, for example) in response to the first application being modified and/or an update being implemented on the first application.

The user interface testing information 180 may comprise a representation, of the fourth image 172, comprising an indication of the first user interface error. FIG. 1Q illustrates an example of the representation (shown with reference number 183). The representation 183 may comprise an indication 184 of an area associated with the first user interface error (e.g., the area may correspond to an area in which the difference between the fourth image 172 and the Group 1 reference image 124 is detected). In some examples, the indication 184 may have a color (e.g., red, blue, green, etc.) that is different than a color used in at least some of the first interface, for example. Accordingly, a viewer of the representation 183 may quickly and/or conveniently identify the first user interface error (e.g., the viewer may quickly and/or conveniently determine that the button 182 of the first interface is not rendered).

In some examples, the user interface testing information 180 may indicate that the first interface has a user interface error based upon a determination that a second similarity score, associated with a similarity between the static portion of the fourth image 172 and the static portion of the Group 1 reference image 124, is less than a threshold similarity score. The second comparison module 178 may determine the second similarity score (using one or more image processing techniques, for example) based upon the fifth image 176 (comprising the static portion of the fourth image 172, for example) and the sixth image 174 (comprising the static portion of the Group 1 reference image 124, for example). In some examples, the second similarity score comprises a SSIM score. The second similarity score may be determined based upon one or more properties (e.g., features) comprising at least one of a luminance of the fifth image 176, a contrast of the fifth image 176, a structure of the fifth image 176, a luminance of the sixth image 174, a contrast of the sixth image 174, a structure of the sixth image 174, etc. The one or more properties may be extracted from the fifth image 176 and/or the sixth image 174. In some examples, the SSIM score may be determined according to equation (1), where x corresponds to at least a portion of the fifth image 176, y corresponds to at least a portion of the sixth image 174, $\mu_x$ corresponds to the average of x, $\mu_y$ corresponds to the average of y, $\sigma_x^2$ corresponds to the variance of x, $\sigma_y^2$ corresponds to the variance of y, $\sigma_{xy}$ corresponds to the covariance of x and y, $c_1=(k_1L)^2$, $c_2=(k_2L)^2$ (e.g., $c_1$ and/or $c_2$ may be variables to stabilize division with a weak denominator), L corresponds to the dynamic range of the pixel-values (e.g., $2^{\#bits\ per\ pixel}-1$), $k_1=0.01$ (or other value) and/or $k_2=0.03$ (or other value). In some examples, the second comparison module 178 may determine that there is a user interface error in the first interface (and/or may include an indication of the user interface error in the user interface testing information 180) based upon a determination that the second similarity score (e.g., the SSIM score) is less than the similarity threshold (e.g., a SSIM score threshold). The second similarity score (e.g., the SSIM score) may be a value from 0 to 1. In an example, the similarity threshold (e.g., the SSIM score threshold) is a value from 0.90000 to 0.99999 (e.g., the similarity threshold may be 0.900, 0.999 or a value between 0.90000 and 0.99999). Other values of the similarity threshold are within the scope of the present disclosure.

In some examples, the user interface testing information 180 may indicate that the first interface has a user interface error and/or that there is a new interface layout detected based upon none of the second layout similarity scores (associated with similarities between the third layout representation 161 associated with the fourth image 172 and the reference layout representations 165 associated with the plurality of groups 107) meeting the threshold layout similarity score, which may be indicative of a layout of the fourth image 172 not matching a layout of any group of the plurality of groups 107 (e.g., the fourth image 172 captures a new and/or unique layout of the first interface different than layouts of the plurality of groups 107).

In some examples, one or more corrective actions may be performed based upon detection of one or more user interface errors (e.g., the first user interface error and/or one or more other user interface errors) in the first interface of the first application. For example, the one or more corrective actions may comprise transmitting an alert to a quality assurance system and/or one or more agents (e.g., testing agents tasked with testing and/or maintaining the first application). FIG. 1R illustrates a user interface alert system 186 transmitting the alert (shown with reference number 188) to a user interface agent device 190 (e.g., a device belonging to an agent tasked with maintaining and/or testing the first application). The alert 188 may comprise the user interface testing information 180. The user interface testing information 180 may be indicative of the one or more user interface errors and/or may be indicative of instructions to fix the one or more user interface errors such that the agent can quickly and/or conveniently fix the one or more user interface errors based upon the user interface testing information 180. In an example, the alert 188 may comprise the representation 183 of the fourth image 172 that identifies the area (e.g., the locality) associated with the first user interface error.

Alternatively and/or additionally, the one or more corrective actions may comprise modifying (e.g., automatically modifying) the first application to fix the one or more user interface errors. In an example in which the one or more user interface errors comprises the button 182 not rendering in the first interface, the one or more corrective actions may comprise modifying the first application (e.g., adding code to a program of the first application, removing code from a program of the first application, modifying code of a program of the first application, etc.) such that the button 182 renders in the first interface.

In some examples, one or more of the techniques provided herein with respect to determining the user interface testing information 180 (by comparing the static portion of the fourth image 172 with the static portion of the Group 1 reference image 124, for example) may be used for other images associated with layouts of the first interface (other than the first layout, for example) corresponding to other groups (other than Group 1, for example) of the plurality of groups 107.

In an example, the second set of dynamic regions (associated with Group 2) of the first interface (e.g., of the second layout of the first interface) may be determined based upon images of Group 2 using one or more of the techniques provided herein with respect to determining the first set of dynamic regions of the first interface. An eighth image of the first interface may be identified. The eighth image may have one or more of the features and/or characteristics discussed herein with respect to the fourth image 172. The layout determination module 163 (shown in FIG. 1O) may determine that the eighth image corresponds to the second layout associated with Group 2. For example, the layout determination module 163 may determine that the eighth image corresponds to the second layout based upon a determination that a layout similarity score associated with a similarity between a layout representation of the eighth image and the Group 2 reference layout representation 149 meets the threshold layout similarity score. Alternatively and/or additionally, the layout determination module 163 may determine that the eighth image corresponds to the second layout based upon a determination that the layout similarity score (associated with the similarity between the layout representation of the eighth image and the Group 2 reference layout representation 149) is the highest layout similarity score among determined layout similarity scores associated with similarities between the layout representation of the eighth image and the reference layout representations 165 of the plurality of groups 107.

In some examples, based upon the second set of dynamic regions (indicated by a second set of dynamic region contours determined using one or more of the techniques provided herein with respect to determining the first set of dynamic region contours 138, for example), a static portion of the eighth image may be compared with a static portion of the Group 2 reference image 143 to determine second user interface testing information associated with the first interface of the first application. For example, the static portion of the eighth image may be compared with the static portion of the Group 2 reference image 143 (based upon the second set of dynamic regions, for example) in response to determining that the eighth image corresponds to the second layout associated with Group 2. In some examples, the static portion of the Group 2 reference image 143 and/or the static portion of the eighth image may correspond to a set of static regions (e.g., a set of one or more static regions) of the first interface (e.g., the second layout of the first interface). The static portion of the eighth image may be compared with the static portion of the Group 2 reference image 143 using one or more of the techniques provided herein with respect to comparing the static portion of the fourth image 172 with the static portion of the Group 1 reference image 124.

In some examples, using one or more of the techniques provided herein with respect to the first interface, user interface testing can be performed for one, some and/or all interfaces of the first application and/or one, some and/or all layouts of interfaces of the first application. Accordingly, the user interface of some and/or all interfaces of the first application may be tested and/or validated automatically and/or one or more detected user interface errors may be fixed automatically. In some examples, using one or more of the techniques provided herein, a user interface test (e.g., a regression test) may be performed for some and/or all interfaces of the first application in response to the first application being modified and/or an update being implemented on the first application.

In some examples, in addition to (and/or as an alternative to) user interface testing, one or more of the techniques provided herein may be used for purposes different than user interface testing. In an example, one or more of the techniques provided herein for clustering the first plurality of images 103 into the plurality of groups 107 may be used for coverage analysis (e.g., coverage analysis associated with user interface testing performed on an application), such as determining one or more coverage metrics associated with one or more tests (e.g., automated tests) executed on the application. For example, the one or more coverage metrics may be indicative of an amount of software of the application that is tested and/or verified via the one or more tests. In an example, using the techniques provided herein, images of an interactive interface of the application may be grouped into groups associated with different layouts. Based upon the groups associated with the different layouts, it may be determined that a layout of the different layouts is not being accounted for (e.g., dynamic regions and/or static regions are not determined for the layout), and thus, testing information determined for images associated with the layout may be incorrect. In response to identifying the layout, dynamic regions and/or static regions associated with the layout may be determined, and the dynamic and/or static regions associated with the layout may be used to (accurately) determine user interface testing information associated with the layout.

In accordance with some embodiments, a plurality of images of an interface of an application may be identified. The plurality of images may be clustered into a plurality of groups that are each associated with a layout of the interface. The plurality of groups may comprise a first group of images associated with a first layout of the interface and/or a second group of images associated with a second layout of the interface. A first image of the interface may be identified. The first image may correspond to the first layout of the interface. Based upon the first group of images (e.g., based upon a set of dynamic regions and/or static regions determined using the first group of images), a first portion (e.g., a static portion) of the first image may be compared with a first portion (e.g., a static portion) of a second image (e.g., a group reference image associated with the first group of images) of the first group of images to determine user interface testing information associated with the interface of the application.

Figure 3:
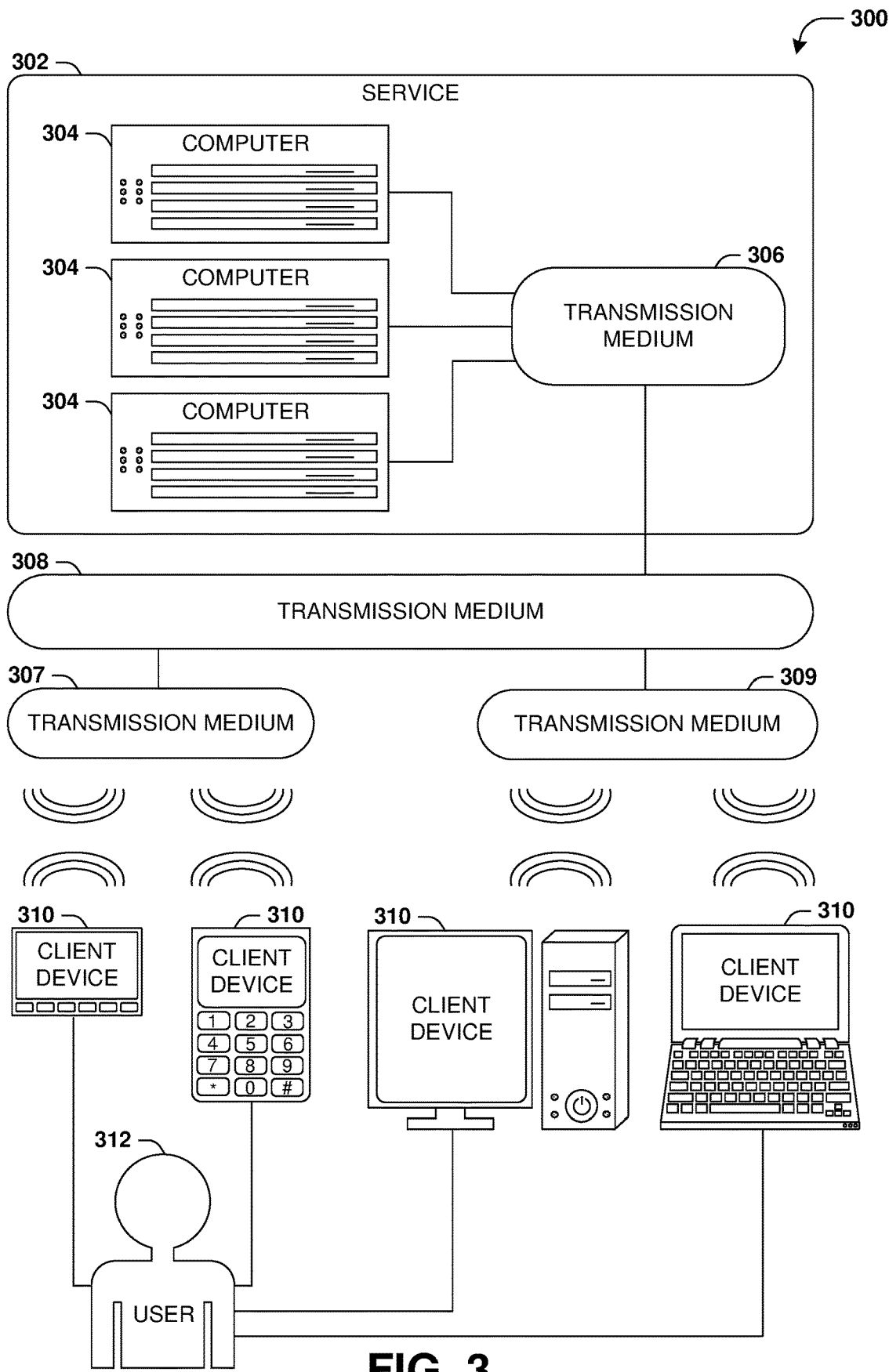
FIG. 3 is an illustration of a scenario involving various examples of transmission mediums that may be used to communicatively couple computers and clients.

FIG. 3 is an interaction diagram of a scenario 300 illustrating a service 302 provided by a set of computers 304 to a set of client devices 310 (e.g., UEs) via various types of transmission mediums. The computers 304 and/or client devices 310 may be capable of transmitting, receiving, processing, and/or storing many types of signals, such as in memory as physical memory states.

The computers 304 of the service 302 may be communicatively coupled together, such as for exchange of communications using a transmission medium 306. The transmission medium 306 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 302.

Likewise, the transmission medium 306 may comprise one or more sub-networks, such as may employ different architectures, may be compliant or compatible with differing protocols and/or may interoperate within the transmission medium 306. Additionally, various types of transmission medium 306 may be interconnected (e.g., a router may provide a link between otherwise separate and independent transmission medium 306).

In scenario 300 of FIG. 3, the transmission medium 306 of the service 302 is connected to a transmission medium 308 that allows the service 302 to exchange data with other services 302 and/or client devices 310. The transmission medium 308 may encompass various combinations of devices with varying levels of distribution and exposure, such as a public wide-area network and/or a private network (e.g., a virtual private network (VPN) of a distributed enterprise).

In the scenario 300 of FIG. 3, the service 302 may be accessed via the transmission medium 308 by a user 312 of one or more client devices 310, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 310 may communicate with the service 302 via various communicative couplings to the transmission medium 308. As a first such example, one or more client devices 310 may comprise a cellular communicator and may communicate with the service 302 by connecting to the transmission medium 308 via a transmission medium 307 provided by a cellular provider. As a second such example, one or more client devices 310 may communicate with the service 302 by connecting to the transmission medium 308 via a transmission medium 309 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 304 and the client devices 310 may communicate over various types of transmission mediums.

Figure 4:
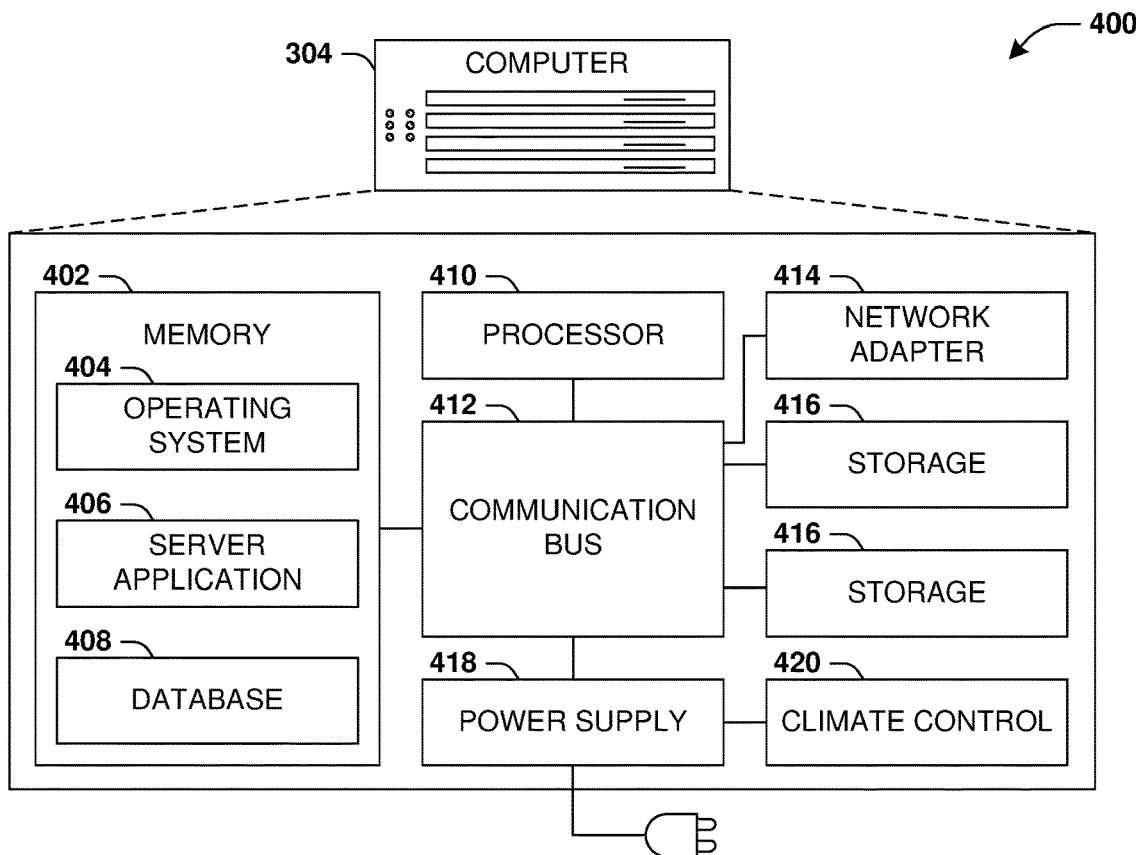
FIG. 4 is an illustration of a scenario involving an example configuration of a computer that may utilize and/or implement at least a portion of the techniques presented herein.

FIG. 4 presents a schematic architecture diagram 400 of a computer 304 that may utilize at least a portion of the techniques provided herein. Such a computer 304 may vary widely in configuration or capabilities, alone or in conjunction with other computers, in order to provide a service such as the service 302.

The computer 304 may comprise one or more processors 410 that process instructions. The one or more processors 410 may optionally include a plurality of cores; one or more coprocessors, such as a mathematics coprocessor or an integrated graphical processing unit (GPU); and/or one or more layers of local cache memory. The computer 304 may comprise memory 402 storing various forms of applications, such as an operating system 404; one or more computer applications 406; and/or various forms of data, such as a database 408 or a file system. The computer 304 may comprise a variety of peripheral components, such as a wired and/or wireless network adapter 414 connectible to a local area network and/or wide area network; one or more storage components 416, such as a hard disk drive, a solid-state storage device (SSD), a flash memory device, and/or a magnetic and/or optical disk reader.

The computer 304 may comprise a mainboard featuring one or more communication buses 412 that interconnect the processor 410, the memory 402, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 412 may interconnect the computer 304 with at least one other computer. Other components that may optionally be included with the computer 304 (though not shown in the schematic architecture diagram 400 of FIG. 4) include a display; a display adapter, such as a graphical processing unit (GPU); input peripherals, such as a keyboard and/or mouse; and a flash memory device that may store a basic input/output system (BIOS) routine that facilitates booting the computer 304 to a state of readiness.

The computer 304 may operate in various physical enclosures, such as a desktop or tower, and/or may be integrated with a display as an "all-in-one" device. The computer 304 may be mounted horizontally and/or in a cabinet or rack, and/or may simply comprise an interconnected set of components. The computer 304 may comprise a dedicated and/or shared power supply 418 that supplies and/or regulates power for the other components. The computer 304 may provide power to and/or receive power from another computer and/or other devices. The computer 304 may comprise a shared and/or dedicated climate control unit 420 that regulates climate properties, such as temperature, humidity, and/or airflow. Many such computers 304 may be configured and/or adapted to utilize at least a portion of the techniques presented herein.

Figure 5:
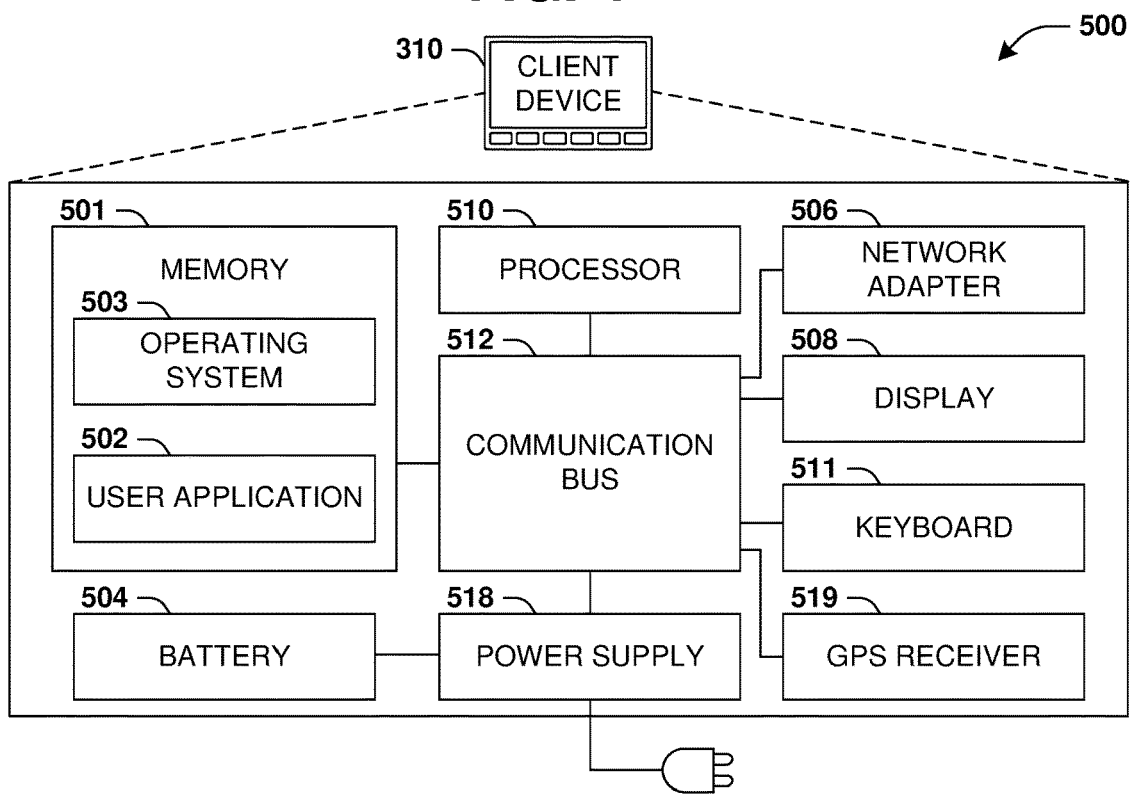
FIG. 5 is an illustration of a scenario involving an example configuration of a client that may utilize and/or implement at least a portion of the techniques presented herein.

FIG. 5 presents a schematic architecture diagram 500 of a client device 310 whereupon at least a portion of the techniques presented herein may be implemented. Such a client device 310 may vary widely in configuration or capabilities, in order to provide a variety of functionality to a user such as the user 312. The client device 310 may be provided in a variety of form factors, such as a desktop or tower workstation; an "all-in-one" device integrated with a display 508; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 310 may serve the user in a variety of roles, such as a workstation, kiosk, media player, gaming device, and/or appliance.

The client device 310 may comprise one or more processors 510 that process instructions. The one or more processors 510 may optionally include a plurality of cores; one or more coprocessors, such as a mathematics coprocessor or an integrated graphical processing unit (GPU); and/or one or more layers of local cache memory. The client device 310 may comprise memory 501 storing various forms of applications, such as an operating system 503; one or more user applications 502, such as document applications, media applications, file and/or data access applications, communication applications such as web browsers and/or email clients, utilities, and/or games; and/or drivers for various peripherals. The client device 310 may comprise a variety of peripheral components, such as a wired and/or wireless network adapter 506 connectible to a local area network and/or wide area network; one or more output components, such as a display 508 coupled with a display adapter (optionally including a graphical processing unit (GPU)), a sound adapter coupled with a speaker, and/or a printer; input devices for receiving input from the user, such as a keyboard 511, a mouse, a microphone, a camera, and/or a touch-sensitive component of the display 508; and/or environmental sensors, such as a global positioning system (GPS) receiver 519 that detects the location, velocity, and/or acceleration of the client device 310, a compass, accelerometer, and/or gyroscope that detects a physical orientation of the client device 310. Other components that may optionally be included with the client device 310 (though not shown in the schematic architecture diagram 500 of FIG. 5) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 310 to a state of readiness; and a climate control unit that regulates climate properties, such as temperature, humidity, and airflow.

The client device 310 may comprise a mainboard featuring one or more communication buses 512 that interconnect the processor 510, the memory 501, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 310 may comprise a dedicated and/or shared power supply 518 that supplies and/or regulates power for other components, and/or a battery 504 that stores power for use while the client device 310 is not connected to a power source via the power supply 518. The client device 310 may provide power to and/or receive power from other client devices.

Figure 6:
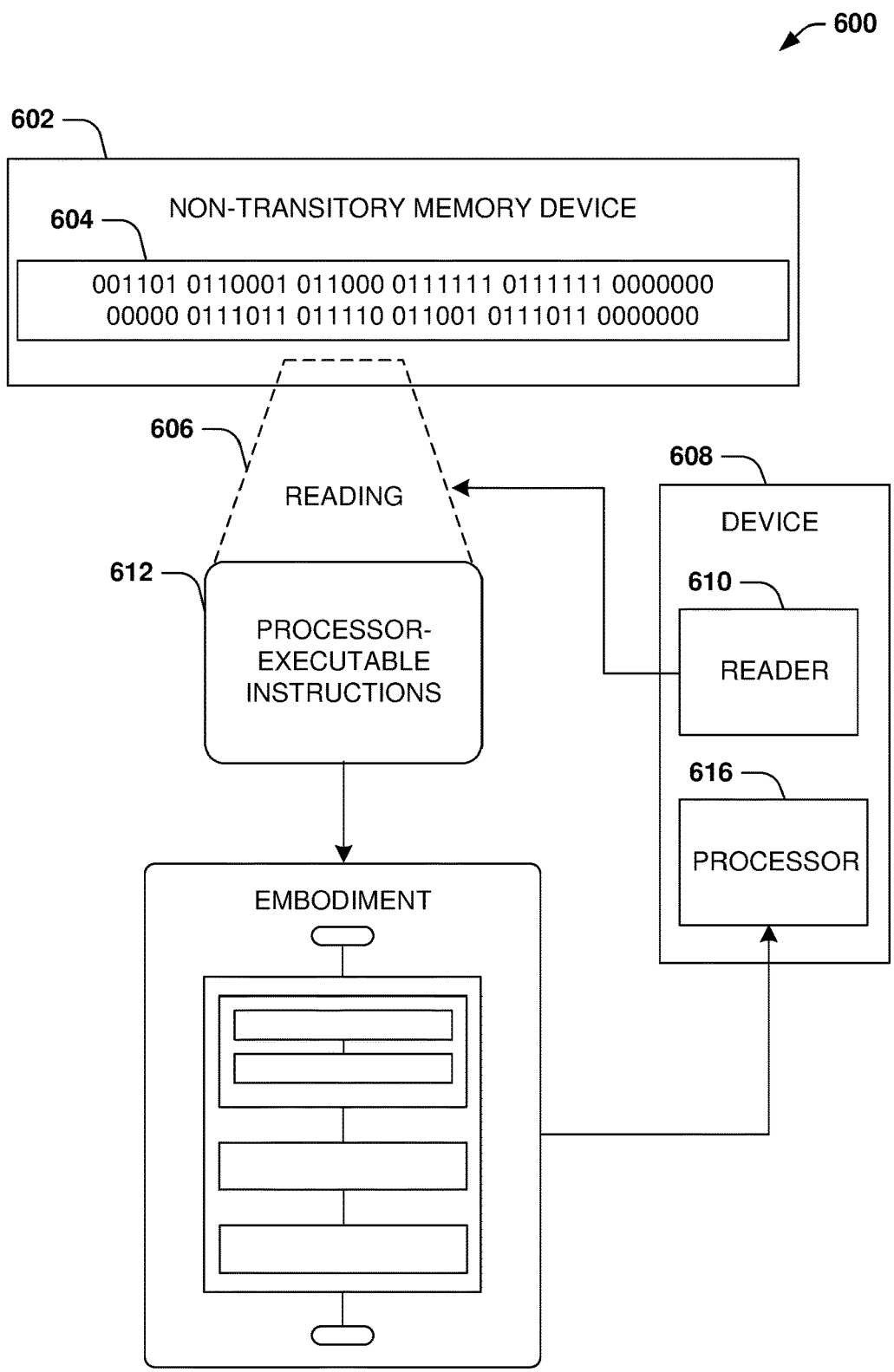
FIG. 6 is an illustration of a scenario featuring an example non-transitory machine-readable medium in accordance with one or more of the provisions set forth herein.

FIG. 6 is an illustration of a scenario 600 involving an example non-transitory machine-readable medium 602. The non-transitory machine-readable medium 602 may comprise processor-executable instructions 612 that when executed by a processor 616 cause performance (e.g., by the processor 616) of at least some of the provisions herein. The non-transitory machine-readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 101 of FIGS. 1A-1R, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer-readable instructions stored on one or more computer-readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    identifying a plurality of images of an interface of an application;
    clustering the plurality of images into a plurality of groups that are each associated with a layout of the interface of the application, wherein the plurality of groups comprise:
        a first group of images associated with a first layout of the interface of the application; and
        a second group of images associated with a second layout of the interface of the application, wherein the second layout of the interface of the application is different than the first layout of the interface of the application;
    comparing a first image of the first group of images with a second image of the first group of images to determine a first set of regions, of the interface, in which the second image is different than the first image;
    comparing the first image with a third image of the first group of images to determine a second set of regions, of the interface, in which the third image is different than the first image;
    determining, based upon the first set of regions and the second set of regions, a set of dynamic regions of the interface;
    identifying a fourth image of the interface;
    determining that the fourth image corresponds to the first layout of the interface based upon a comparison of a layout representation of the fourth image with layout representations associated with multiple layouts of the interface; and
    comparing, based upon the set of dynamic regions, a static portion of the fourth image with a static portion of the first image but not one or more portions of the first image corresponding to the set of dynamic regions to determine user interface testing information associated with the interface of the application.

2. The method of claim 1, comprising:
    comparing a fifth image of the second group of images with a sixth image of the second group of images to determine a third set of regions, of the interface, in which the sixth image is different than the fifth image;
    comparing the fifth image with a seventh image of the second group of images to determine a fourth set of regions, of the interface, in which the seventh image is different than the fifth image;
    determining, based upon the third set of regions and the fourth set of regions, a second set of dynamic regions of the interface;
    identifying an eighth image of the interface;
    determining that the eighth image corresponds to the second layout of the interface; and
    in response to determining that the eighth image corresponds to the second layout of the interface, comparing, based upon the second set of dynamic regions, a first portion of the eighth image with a first portion of the fifth image to determine second user interface testing information associated with the interface of the application.

3. The method of claim 1, wherein:
    clustering the plurality of images into the plurality of groups comprises:
        determining, based upon the plurality of images, a plurality of sets of features associated with the plurality of images; and
        performing, based upon the plurality of sets of features, a first clustering process to cluster the plurality of images into a second plurality of groups.

4. The method of claim 3, wherein:
    determining a set of features, of the plurality of sets of features, associated with a fifth image comprises:
        comparing the fifth image with a sixth image to determine one or more comparison metrics associated with the fifth image and the sixth image; and
        determining a histogram associated with the fifth image.

5. The method of claim 4, wherein:
    the one or more comparison metrics comprise a Structural Similarity Index (SSIM) score.

6. The method of claim 4, wherein:
    clustering the plurality of images into the plurality of groups comprises:
        generating layout representations of images of a third group of images of the second plurality of groups;
        determining one or more layout similarity scores associated with similarities between the layout representations; and
        determining whether to cluster the third group of images into sub-groups based upon the one or more layout similarity scores.

7. The method of claim 6, wherein:
    generating a layout representation of the layout representations comprises:
        determining edges of an image of the third group of images using canny edge detection;

determining contours of the image based upon the edges;

removing, from the contours, contours with sizes smaller than a threshold size to generate a filtered set of contours; and generating the layout representation based upon the filtered set of contours.

8. The method of claim 6, wherein clustering the plurality of images into the plurality of groups comprises:

in response to determining to cluster the third group of images into sub-groups, performing, based upon the one or more layout similarity scores, a second clustering process to cluster the third group of images into two or more groups comprising the first group of images and the second group of images.

9. The method of claim 6, wherein clustering the plurality of images into the plurality of groups comprises:

in response to determining not to cluster the third group of images into sub-groups, including the third group of images in the plurality of groups without clustering the third group of images into sub-groups.

10. The method of claim 3, comprising:

determining a first quantity of groups for the first clustering process, wherein the first clustering process is performed, based upon the first quantity of groups, such that a quantity of groups of the second plurality of groups is equal to the first quantity of groups.

11. The method of claim 10, wherein:

determining the first quantity of groups comprises:

determining, based upon the plurality of sets of features, variance metrics associated with a plurality of quantities of groups; and selecting the first quantity of groups from the plurality of quantities of groups based upon the variance metrics.

12. The method of claim 11, wherein selecting the first quantity of groups is performed based upon a determination that a variance metric associated with the first quantity of groups corresponds to an elbow of a curve associated with the variance metrics.

13. The method of claim 1, wherein:

determining that the fourth image corresponds to the first layout of the interface comprises:

generating the layout representation of the fourth image;

comparing the layout representation with layout representations associated with multiple layouts of the interface to determine a plurality of layout similarity scores associated with similarities between the layout representation and the layout representations associated with the multiple layouts; and determining that a layout similarity score associated with the first layout at least one of:

exceeds a threshold layout similarity score; or is the highest layout similarity score of the plurality of layout similarity scores.

14. The method of claim 13, wherein:

generating the layout representation comprises:

determining edges of the fourth image using canny edge detection;

determining contours of the fourth image based upon the edges;

removing, from the contours, contours with sizes smaller than a threshold size to generate a filtered set of contours; and generating the layout representation based upon the filtered set of contours.

15. The method of claim 1, wherein:

the set of dynamic regions comprise the first set of regions and the second set of regions.

16. The method of claim 1, wherein at least one of:

the first portion of the first image corresponds to a set of static regions, of the interface, different than the set of dynamic regions of the interface;

the first portion of the fourth image corresponds to the set of static regions of the interface; or the user interface testing information is indicative of a region, in the set of static regions of the interface, in which in the fourth image is different than the first image.

17. A non-transitory computer-readable medium storing instructions that when executed perform operations comprising:

identifying a plurality of images of an interface of an application;

clustering the plurality of images into a plurality of groups that are each associated with a layout of the interface of the application, wherein the plurality of groups comprise:

a first group of images associated with a first layout of the interface of the application; and a second group of images associated with a second layout of the interface of the application, wherein the second layout of the interface of the application is different than the first layout of the interface of the application;

comparing a first image of the first group of images with a second image of the first group of images to determine a first set of regions, of the interface, in which the second image is different than the first image;

comparing the first image with a third image of the first group of images to determine a second set of regions, of the interface, in which the third image is different than the first image;

determining, based upon the first set of regions and the second set of regions, a set of dynamic regions of the interface;

identifying a fourth image of the interface;

determining that the fourth image corresponds to the first layout of the interface based upon a comparison of a layout representation of the fourth image with layout representations associated with multiple layouts of the interface; and comparing, based upon the set of dynamic regions, a static portion of the fourth image with a static portion of the first image but not one or more portions of the first image corresponding to the set of dynamic regions to determine user interface testing information associated with the interface of the application.

18. The non-transitory computer-readable medium of claim 17, wherein:

the user interface testing information indicates that the interface has a user interface error based upon a determination that a similarity score associated with a similarity between the first portion of the first image and the first portion of the fourth image is less than a threshold.

19. A device comprising:

a processor configured to execute instructions to perform operations comprising:

identifying a plurality of images of an interface of an application;

clustering the plurality of images into a plurality of groups that are each associated with a layout of the interface of the application, wherein the plurality of groups comprise:
- a first group of images associated with a first layout of the interface of the application; and
- a second group of images associated with a second layout of the interface of the application, wherein the second layout of the interface of the application is different than the first layout of the interface of the application;

identifying a first image, of the interface, corresponding to the first layout of the interface; and comparing, based upon the first group of images, a static portion of the first image with a static portion of a second image of the first group of images but not one or more portions of the second image corresponding to a set of dynamic regions to determine user interface testing information associated with the interface of the application.

20. The device of claim 19, wherein:
the plurality of images comprises screenshots captured via execution of one or more automated tests on the application.

* * * * *